(12) United States Patent
Hernu et al.

(10) Patent No.: US 10,066,761 B1
(45) Date of Patent: Sep. 4, 2018

(54) VALVE ASSEMBLY AND LIMIT SWITCH ASSEMBLY THEREFOR

(71) Applicant: Schneider Electric Systems USA, Inc., Foxboro, MA (US)

(72) Inventors: Stéphane Marc Louis Hernu, Altdorf (DE); Jonathan Dostert, Schwieberdingen (DE)

(73) Assignee: Schneider Electric Systems USA, Inc., Foxboro, MA (US)

( * ) Notice: Subject to any disclaimer, the term of this patent is extended or adjusted under 35 U.S.C. 154(b) by 0 days.

(21) Appl. No.: 15/451,053

(22) Filed: Mar. 6, 2017

(51) Int. Cl.
*F16K 31/06* (2006.01)
*F16K 37/00* (2006.01)
*F16K 31/12* (2006.01)

(52) U.S. Cl.
CPC .......... *F16K 37/0083* (2013.01); *F16K 31/12* (2013.01); *F16K 37/0025* (2013.01); *F16K 37/0033* (2013.01); *Y10T 137/794* (2015.04); *Y10T 137/7976* (2015.04)

(58) Field of Classification Search
CPC ........... F16K 37/0083; F16K 137/0025; F16K 137/0033; Y10T 137/794; Y10T 137/7976
See application file for complete search history.

(56) References Cited

U.S. PATENT DOCUMENTS

| | | | |
|---|---|---|---|
| 6,695,282 B2 * | 2/2004 | Clemens | F16K 37/0033 251/129.01 |
| 9,347,584 B2 * | 5/2016 | Huang | F16K 37/005 |
| 9,618,136 B2 * | 4/2017 | Bell | F16K 37/0008 |
| 9,714,718 B2 * | 7/2017 | Rogala | F16K 27/029 |
| 9,909,687 B2 * | 3/2018 | Clark | G08B 21/18 |

* cited by examiner

*Primary Examiner* — Craig Schneider
*Assistant Examiner* — Kevin Barss
(74) *Attorney, Agent, or Firm* — Senniger Powers

(57) ABSTRACT

A valve assembly includes a valve, an actuator for opening and closing the valve, and a positioner for controlling the actuator. At least one limit switch assembly is mounted between the positioner and the actuator. The limit switch assembly connects the actuator and positioner so that movement of the actuator valve is conveyed to the positioner through the limit switch assembly. The limit switch assembly is configured to provide a limit signal when the valve is in one or more limit positions. The limit switch assembly has a calibration mechanism for adjusting the one or more limit positions using an input member accessible from outside of the limit switch housing when the limit switch is installed in the valve assembly.

28 Claims, 19 Drawing Sheets

VALVE ASSEMBLY AND LIMIT SWITCH ASSEMBLY THEREFOR

TECHNICAL FIELD

The present disclosure generally relates to a valve assembly comprising a limit switch assembly and more specifically to a valve assembly comprising a limit switch assembly mountable between a positioner and an actuator of the valve assembly and having a calibration mechanism for calibrating the limit switch assembly using an input member accessible outside of the limit switch assembly housing.

BACKGROUND

Valve assemblies are used to regulate the transmission and distribution of fluid in various processes. Typical valve assemblies include a valve having a valve member that is movable to open and close the valve and an actuator having a movable output member (e.g., a stem) configured to drive movement of the valve member. Certain valve assemblies, most commonly pneumatically actuated valve assemblies, also include a valve positioner for controlling the valve actuator.

A valve positioner controls the actuator based on control signals received from a centralized process controller and/or feedback control that is processed locally by a processor of the positioner and typically includes a feedback shaft that is linked to the output member of the actuator for movement that corresponds with opening and closing of the valve. The valve positioner includes one or more position sensors that are configured to sense the position of the feedback shaft and output a corresponding position signal. A control processor (e.g., a centralized process controller or a control processor local to the valve positioner) receives the position signal and uses the position signal to determine whether the valve position should be changed. When the valve position must be changed, the control processor sends a control signal to the valve positioner and the valve positioner adjusts the position of the valve using the actuator.

Various types of actuators are known in the art. For example, some valve assemblies use pneumatic actuators, hydraulic actuators, electronic actuators, etc. For pneumatic actuators, a positioner is operatively connected to the actuator via a pneumatic connection. Based on the control signal, the valve positioner actuates the pneumatic actuator to adjust the position of the valve, thereby adjusting the position of the valve member to throttle the flow of process fluid through the valve to the desired amount.

In some instances, particularly when a valve is controlled by a centralized process controller, it may be desirable to provide redundant feedback information about the position of a valve. In such situations, a limit switch assembly or limit switch box can be operatively installed in the valve assembly. A limit switch assembly includes a feedback member that is operatively connected to the output member of the valve actuator for movement in response to movement of the valve actuator. Such a limit switch assembly can be operatively connected to the output member of the actuator using a linkage that is separate from the linkage that connects the feedback shaft of the valve positioner to the output member, or alternatively the feedback member can be directly connected to the feedback shaft of the valve positioner so that the limit switch assembly is appended to the valve positioner. A conventional limit switch assembly includes a position sensor for detecting the feedback member when it is moved to one or more predetermined limit positions. Typically, the limit switch assembly is calibrated so that a position sensor detects when the feedback member is positioned at a positon that corresponds with a position of the output member of the actuator when the valve is either fully open or fully closed. Calibrating a limit switch assembly involves adjusting the relative positions of the position sensor and the feedback member so that the position sensor detects the feedback member at the fully opened and/or fully closed position, which entails opening a limit switch assembly housing to access a calibration mechanism in the interior of the limit switch assembly.

SUMMARY

The present disclosure generally relates to a valve assembly comprising limit switch assemblies mountable between a valve positioner and an actuator of the valve assembly. Each limit switch assembly is configured to provide a limit signal with the valve of the valve assembly is positioned in one or more limit positions. The limit switch assembly has a calibration mechanism for adjusting the one or more limit positions using an input member accessible from outside of the limit switch housing when the limit switch is installed in the valve assembly.

In one aspect, a limit switch assembly is configured to be operatively installed in a valve assembly. The valve assembly comprises a valve, an actuator movable to selectively open and close the valve, and a positioner for controlling movement of the actuator. The limit switch assembly comprises a housing defining a sensor cavity and having a proximal end wall and a distal end wall spaced apart from one another along a feedback axis. A limit position sensing assembly received in the sensor cavity comprises a linking pin movably connected to the housing for movement with respect to the housing through a range of motion including at least one limit position. The linking pin extends along the feedback axis and has a proximal end portion and a distal end portion spaced apart from one another along the feedback axis. The proximal end portion of the linking pin is configured for being operatively connected to the actuator such that movement of the actuator drives corresponding movement of the linking pin through the range of motion. At least one position sensor is configured to detect when the linking pin is positioned in the at least one limit position. The proximal end portion of the linking pin is exposed through the proximal end wall of the housing for being operatively connected to the actuator and the distal end portion of the linking pin is exposed through the distal end wall for being operatively connected to a feedback shaft of the positioner to operatively install the limit switch assembly in the valve assembly. The limit switch assembly is received between the positioner and the actuator when the limit switch assembly is operatively installed in the valve assembly such that the proximal end wall is located adjacent the actuator and the distal end wall is located adjacent the positioner and the linking pin operatively links the actuator to the feedback shaft of the positioner to drive movement of the feedback shaft in response to movement of the actuator.

In another aspect, a limit switch assembly is configured to be operatively installed in a valve assembly. The valve assembly comprises a valve and an actuator movable to selectively open and close the valve. The limit switch assembly comprises a housing defining a sensor cavity. A limit position sensing assembly received in the sensor cavity comprises a feedback member configured to be operatively connected to the actuator such that movement of the actuator drives movement of the feedback member through a range of motion including at least one limit position. At least one position sensor is configured to detect at least one position of the feedback member in the range of motion. A calibration mechanism is configured for adjusting a relative position between the feedback member and the at least one position sensor to operatively align the at least one position sensor with the feedback member for detecting the position of the feedback member in the at least one limit position. The calibration mechanism comprises an input member movably mounted on the housing outside the sensor for movement in response to an input force and a calibration linkage extending through the housing and being operatively connected to the limit position sensing assembly and the input member to adjust said relative position between the feedback member and the at least one position sensor in response to movement of the input member.

Other aspects and features will be apparent hereinafter.

BRIEF DESCRIPTION OF THE DRAWINGS

Corresponding reference characters indicate corresponding parts throughout the drawings.

DETAILED DESCRIPTION

Figure 1:
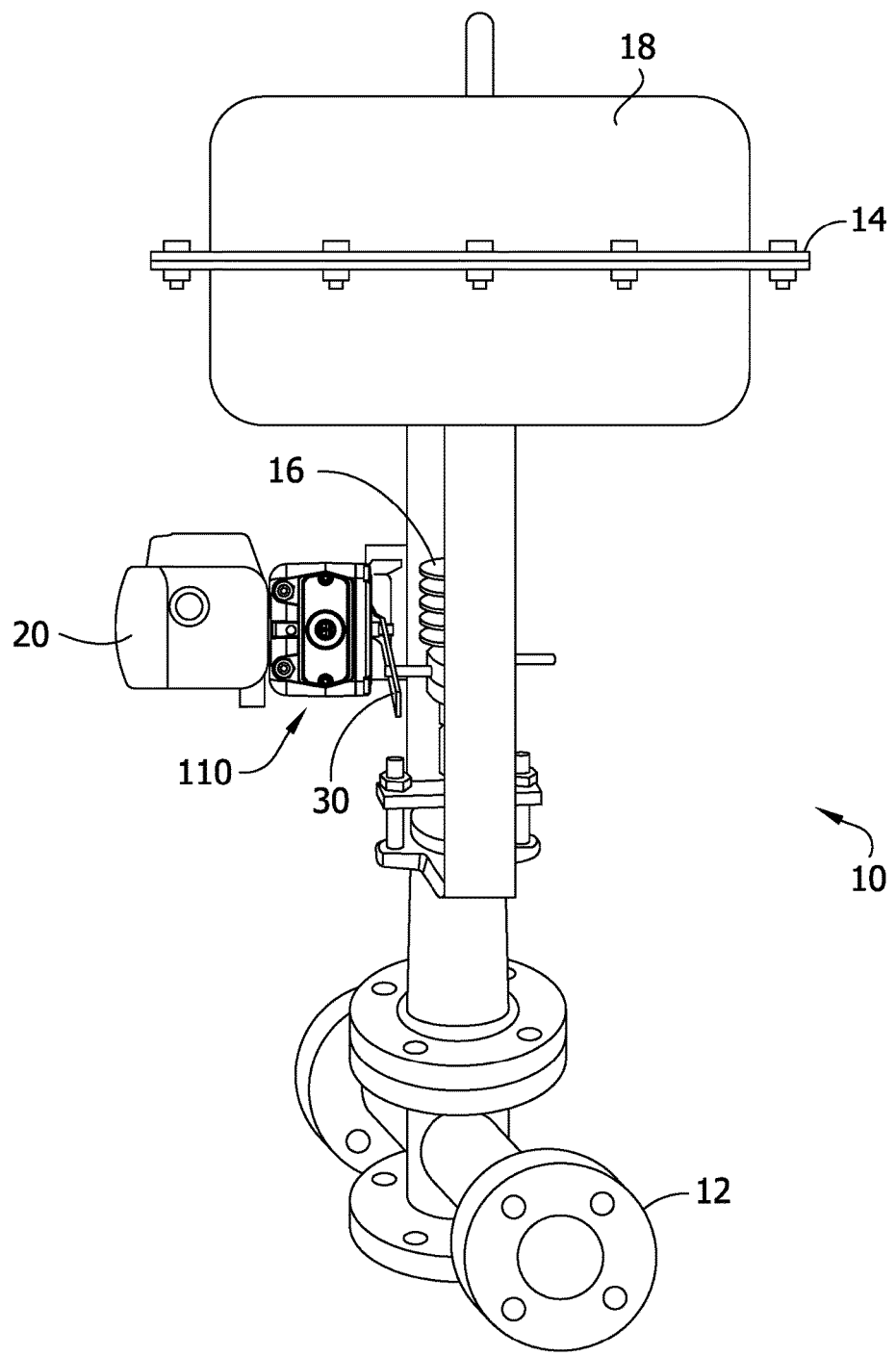
FIG. 1 is a perspective of a valve assembly according to an embodiment.
Figure 2:
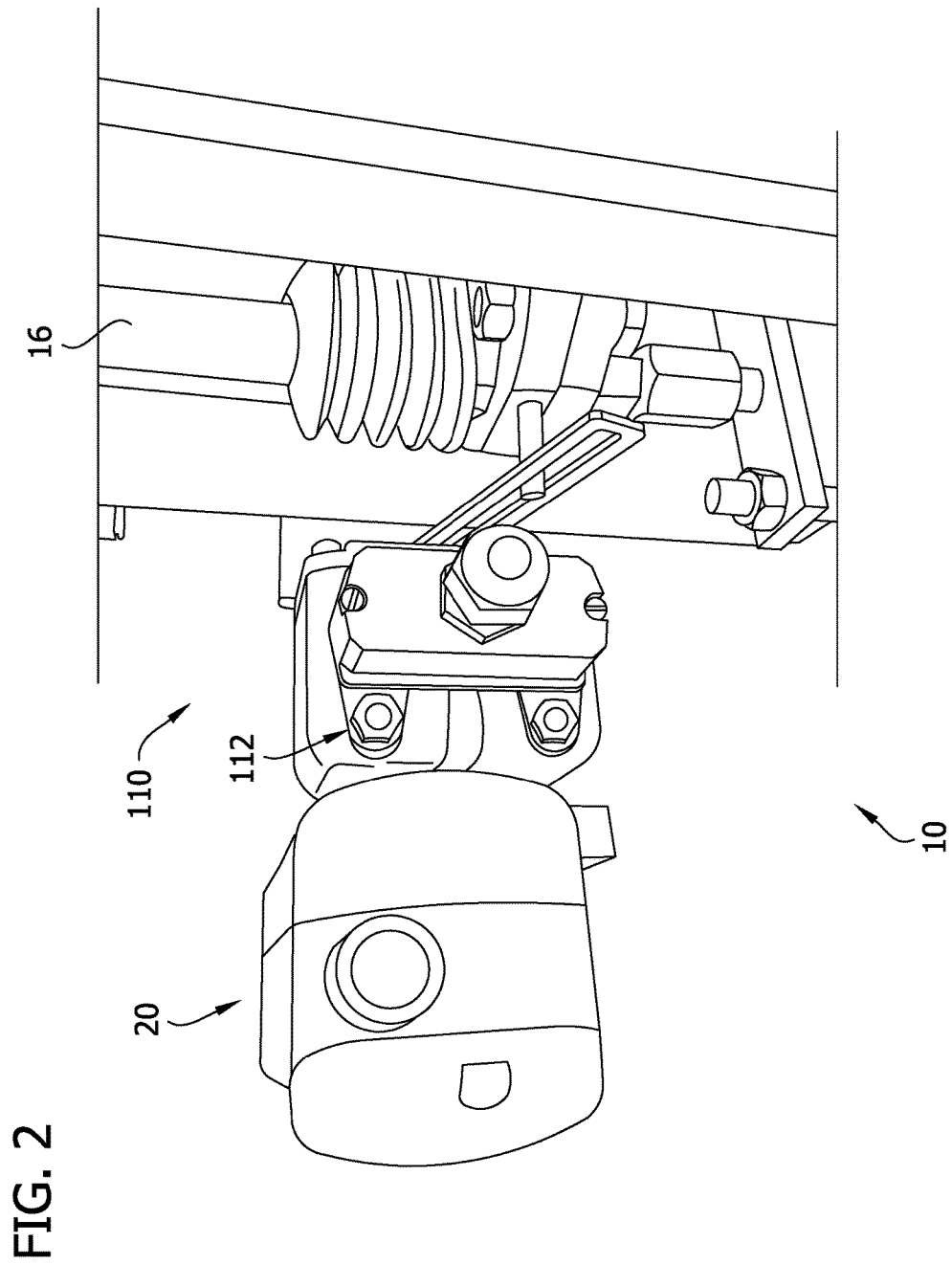
FIG. 2 is an enlarged perspective of a portion of the valve assembly of FIG. 1 including a valve positioner, a limit switch assembly, and a feedback linkage thereof.
Figure 3:
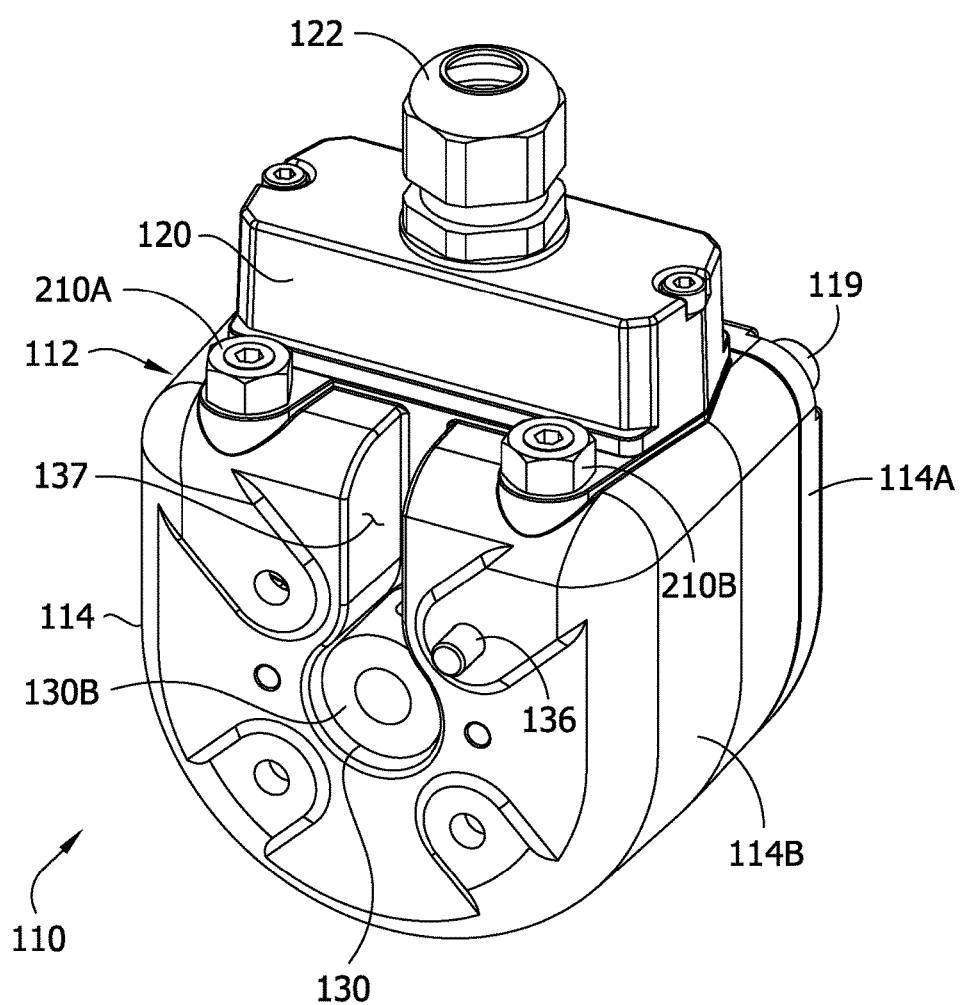
FIG. 3 is a distal end perspective of the limit switch assembly.
Figure 4:
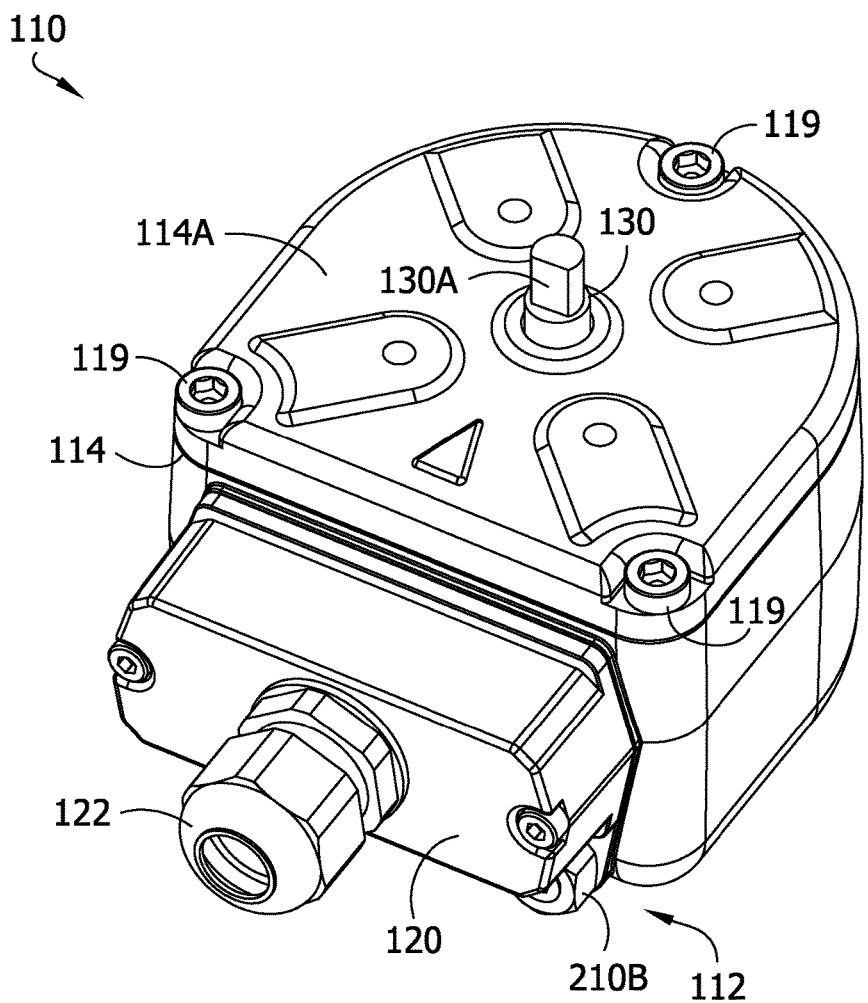
FIG. 4 is a proximal end perspective of the limit switch assembly.
Figure 5:
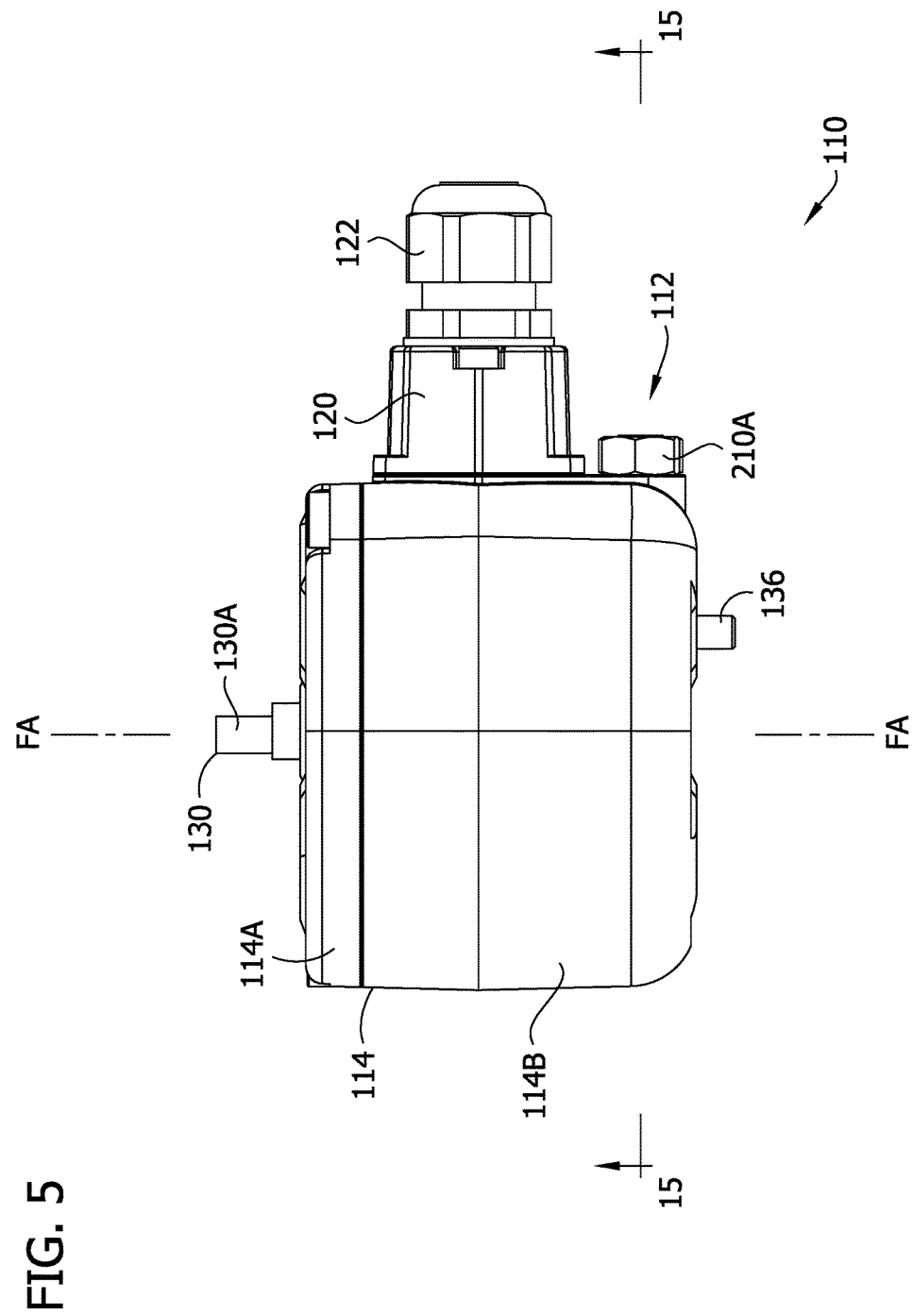
FIG. 5 is an elevation of the limit switch assembly.
Figure 6:
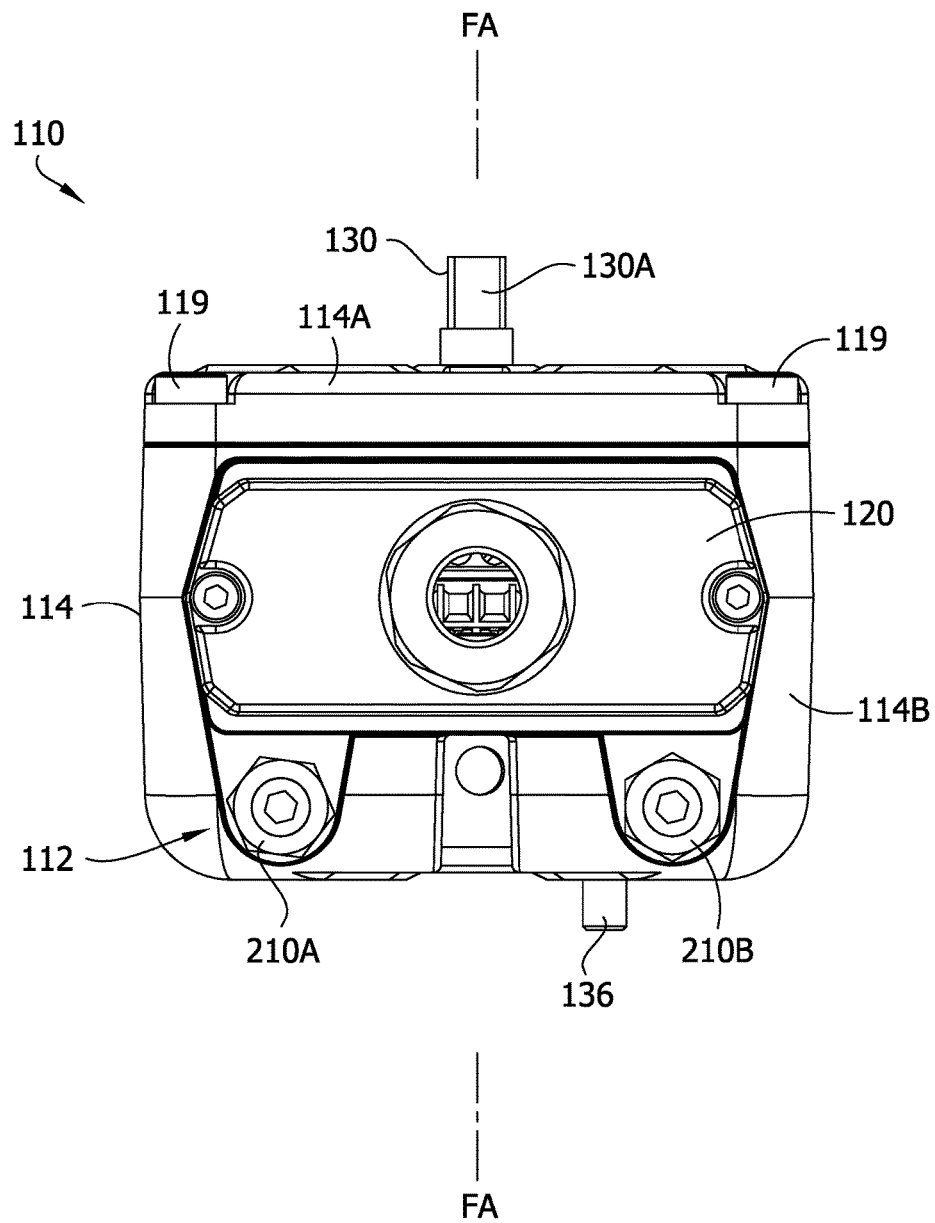
FIG. 6 is another elevation of the limit switch assembly.
Figure 7:
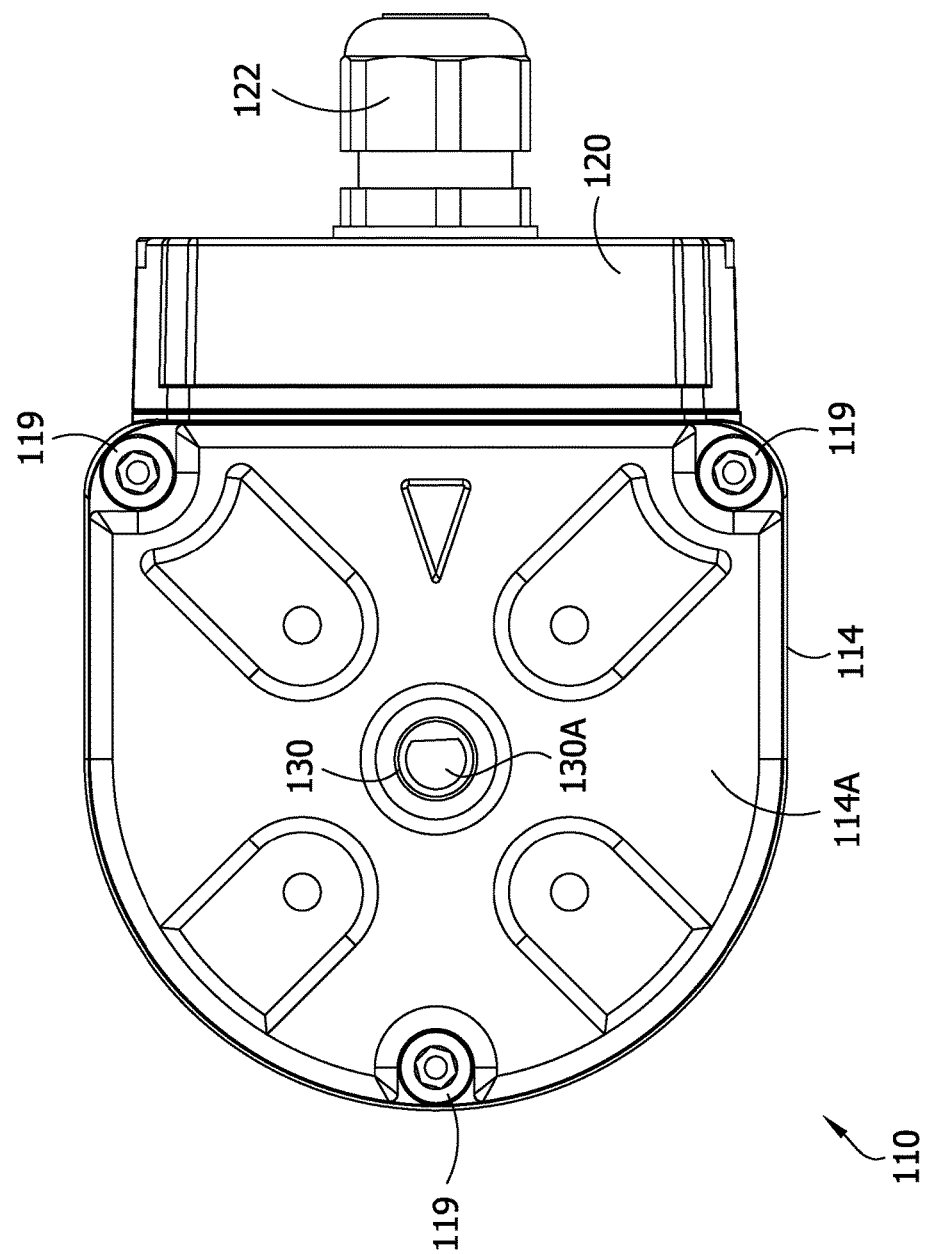
FIG. 7 is a proximal end plan view of the limit switch assembly.
Figure 8:
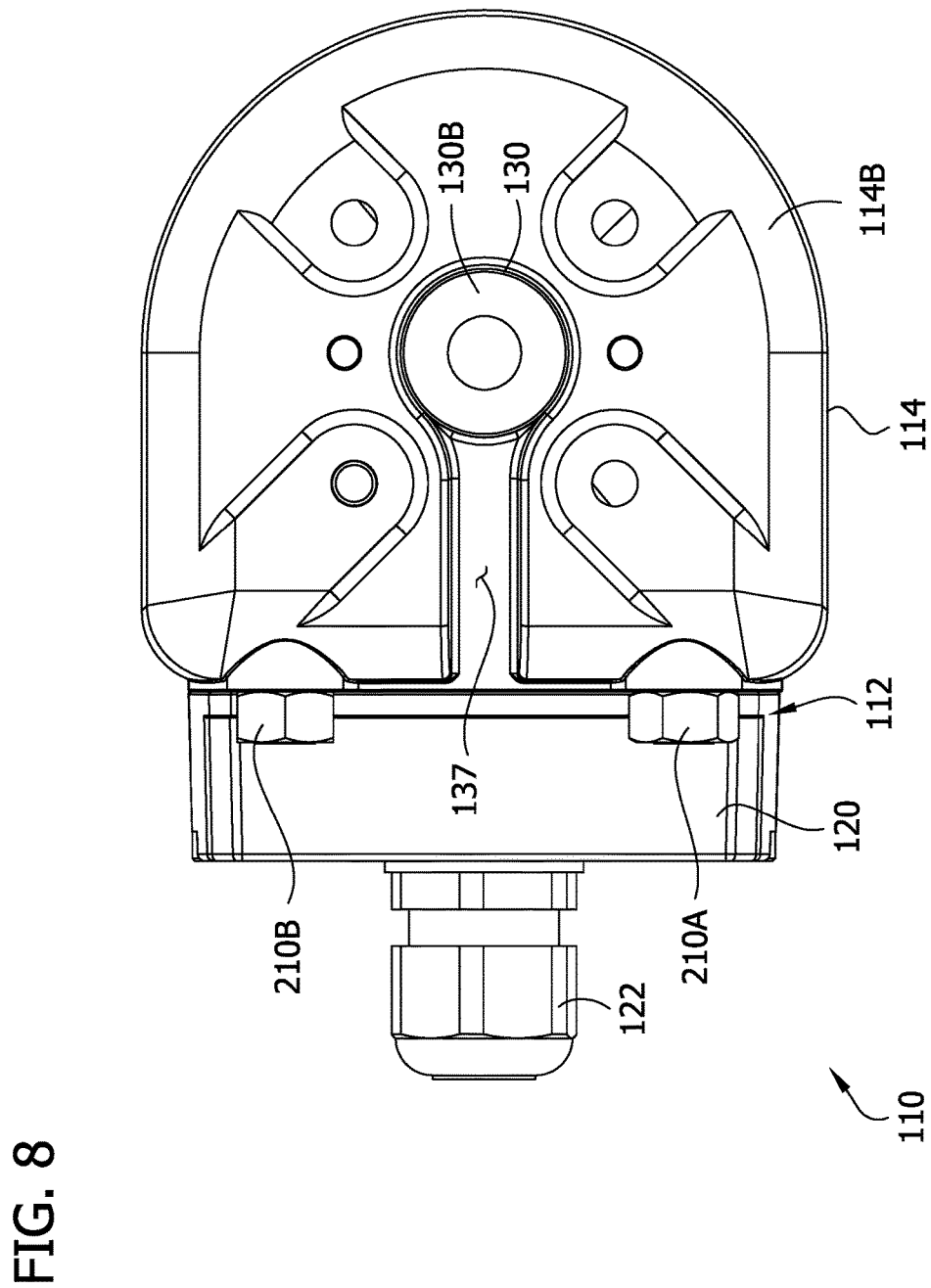
FIG. 8 is a distal end plan view of the limit switch assembly.

Referring to FIGS. 1 and 2, one embodiment of a valve assembly for controlling the flow of process fluid through a pipe or other flow channel in a process facility is generally indicated at reference number 10. The valve assembly 10 includes a pneumatically actuated valve 12 configured to selectively throttle and/or shutoff the flow of process fluid through the flow channel. Any suitable type of valve may be used in various embodiments of the valve assembly, including, for example, a gate valve, a globe valve, a check valve, a stop check valve, a butterfly valve, a ball valve, a plug valve, a diaphragm valve, a safety relieve valve, etc. In the illustrated embodiment, the valve 12 is a linear valve; but as discussed below, rotary valves may also be used in other embodiments. As is known in the art, the valve 12 includes a conduit defining a flow passage and a valve member (not shown) movable with respect to the flow passage through a range of motion to open and close the valve. Suitably, the valve member is movable through a range of motion extending from a fully open position in which the cross-sectional size of the flow passage as it extends past the valve member is at its maximum to a fully closed position in which the cross-sectional size of the flow passage as it extends past the valve member is at its minimum.

The valve assembly 10 also includes a pneumatic actuator 14 configured to drive movement of the valve member through its range of motion to open and close the valve. Though the illustrated embodiment uses a pneumatic actuator 14, embodiments of a valve assembly can include any type of actuator (e.g., hydraulic, electronic, etc.) suitable for selectively moving the valve member through its range of motion to open and close the valve. The actuator 14 generally comprises an output member or stem 16 that is linked to the valve member of the valve 12. An actuator drive mechanism 18 is configured to drive movement of the stem 16 that moves the valve member through its range of motion. For example, the illustrated drive mechanism 18 drives movement of the stem 16 along its axis to open and close the valve 12.

The valve assembly further comprises a valve positioner, generally indicated at 20, which is operatively connected to the actuator 14 to control how and when the actuator drives movement of the stem 16 to open and close the valve 12. Since the illustrated actuator 14 is a pneumatic actuator, the valve positioner 20 is connected to the actuator via a pneumatic connection, but other valve positioners will be connected to actuators via other types of connections (e.g., hydraulic, electrical, etc.) in other embodiments. In general, the valve positioner 20 is configured to provide feedback information about the position of the valve 12 to a control processor, which processes the feedback information and sends control signals to the valve positioner for controlling the actuator. For example, in some embodiments, the valve positioner 20 is operatively connected to a process controller of a centralized or distributed process control network. In addition or in the alternative, the valve positioner 20 can include a local process controller that provides suitable control signals for controlling the actuator 14. In an exemplary embodiment, the positioner 20 can comprise a valve positioner as described in European Patent Application Publication No. 3088780, which is hereby incorporated by reference in its entirety.

Figure 17:
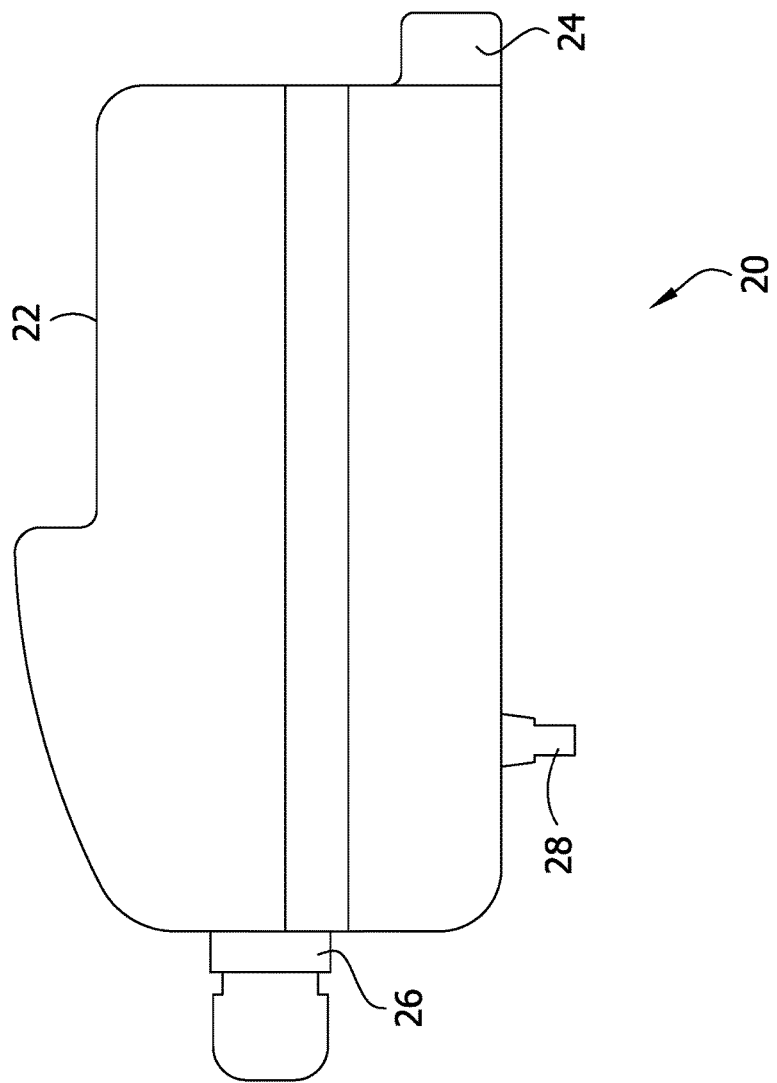
FIG. 17 is a schematic elevation of the valve positioner.

As shown in FIG. 17, one suitable embodiment of a positioner 20 includes an enclosure 22, which houses pneumatic conduits and valves, processors, sensors, and the like. One or more pneumatic fittings 24 are mounted on the enclosure 22 for pneumatically communicating between the positioner and the actuator. Additionally, a process communications connector 26 is mounted on the enclosure 22 that connects the positioner 20 to a wire or cable (not shown) that transmits communications between the positioner and a remotely located control processor. A feedback shaft 28 is also installed in the enclosure and protrudes from a proximal wall of the enclosure for being operatively connected the stem 16 of actuator 14 as described in further detail below.

Referring to FIG. 2, the valve assembly 10 includes a feedback linkage 30, which links the actuator stem 16 to the feedback shaft 28 for movement in response to movement of the actuator stem. In the illustrated embodiment, the linkage 30 comprises a slider bar linkage that rotates the feedback shaft 28 of positioner 20 about its axis in response to translation of the actuator stem 16 along its axis. It will be understood that other feedback linkages can be used in other embodiments. The feedback shaft 28 moves in response to movement of the actuator stem 16, and the positioner is configured to sense the position of the feedback shaft. Because the feedback shaft 28 is linked to the actuator stem 16, which in turn is linked the body of the valve 12, the position of the feedback shaft is mechanically linked or correlated to the position of the valve. The positioner 20 is configured to sense the position of the feedback shaft 28 and output to the control processor(s) a position signal representative of the sensed position of the feedback shaft. The control processor uses the position signal as an indication of the position of the valve 12.

The illustrated valve assembly 10 further includes a limit switch assembly, generally indicated at 110, configured to provide redundant feedback information about the position of the valve 12 to a control processor. In general, a suitable limit switch assembly 110 can be operatively linked to the actuator 14 to detect when the valve member is positioned in at least one limit position within its range of motion. As explained below, the illustrated limit switch assembly 110 provides a mechanical feedback link between the actuator stem 16 and the feedback shaft 28 of positioner 20 such that components of the limit switch assembly move in response to movement of the actuator stem and drive corresponding movement of the feedback shaft. In the illustrated embodiment, the limit switch assembly 110 is configured to detect when the valve member is in either of two limit positions. And as explained in further detail below, the limit switch assembly 110 includes a calibration mechanism, generally indicated at 112, for manually adjusting the configurations of the two limit positions from a position external to the limit switch assembly to configure the limit positions so that they are aligned with the fully open and fully closed positions of the valve 12.

Figure 9:
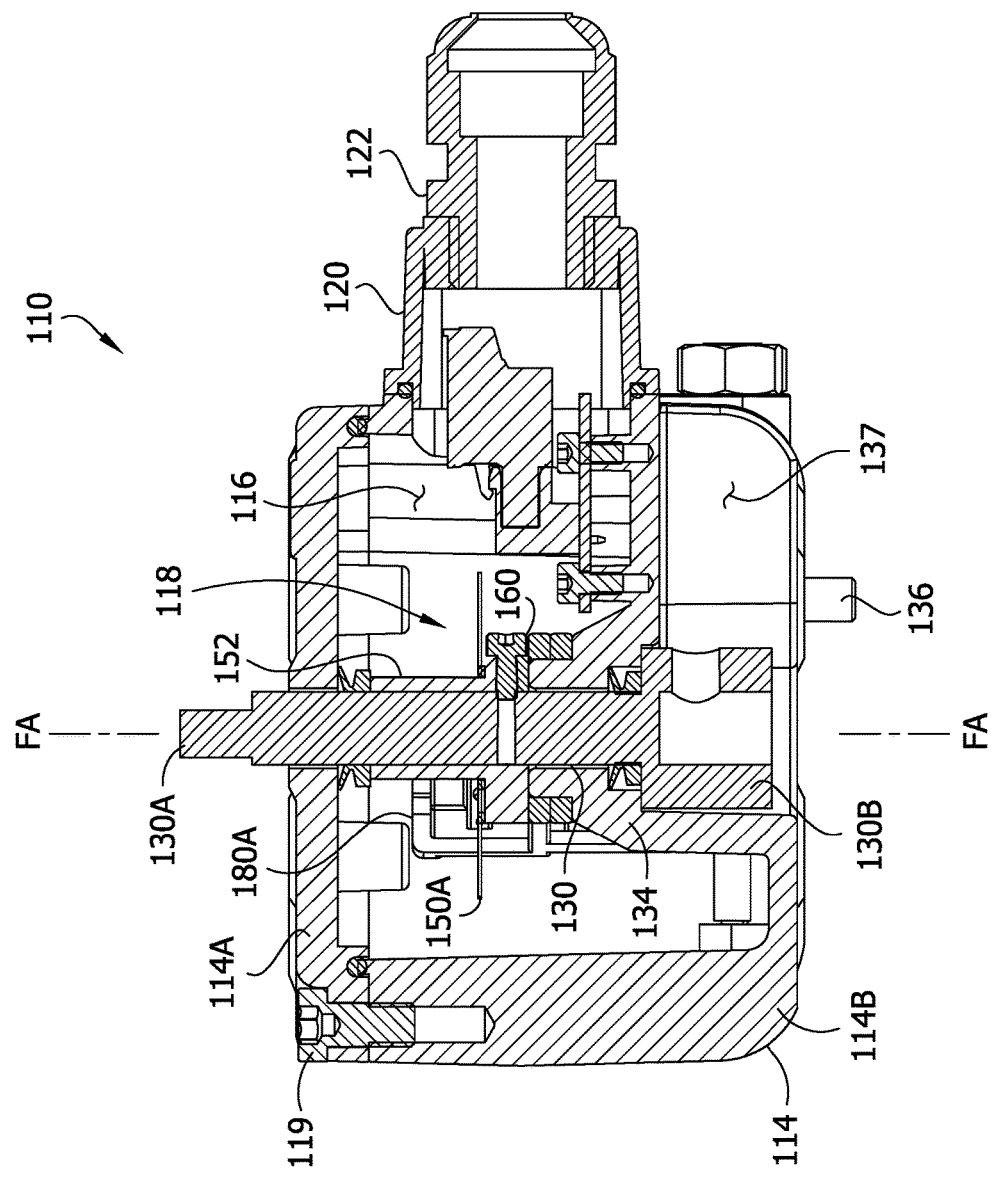
FIG. 9 is a cross section taken in the plane of line 9-9 of FIG. 8.
Figure 10:
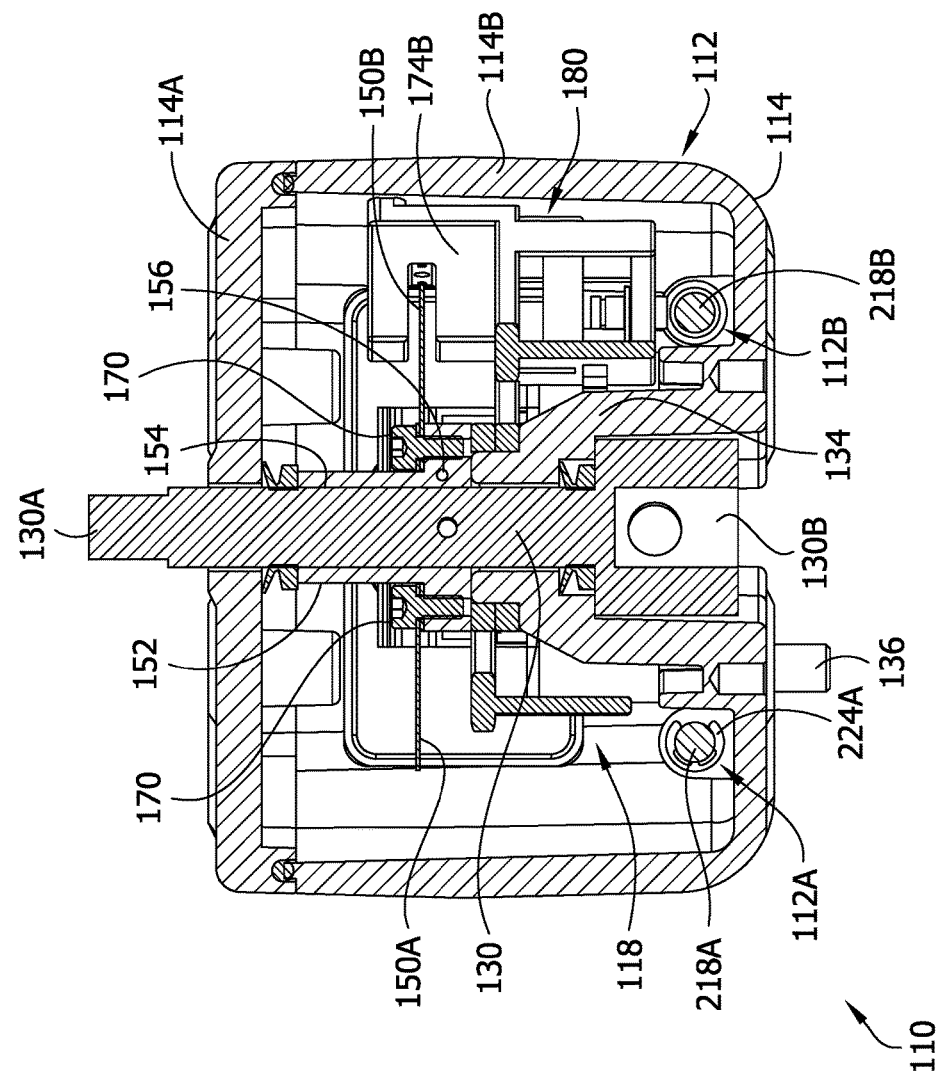
FIG. 10 is a cross section taken in the plane of line 10-10 of FIG. 8.
Figure 11:
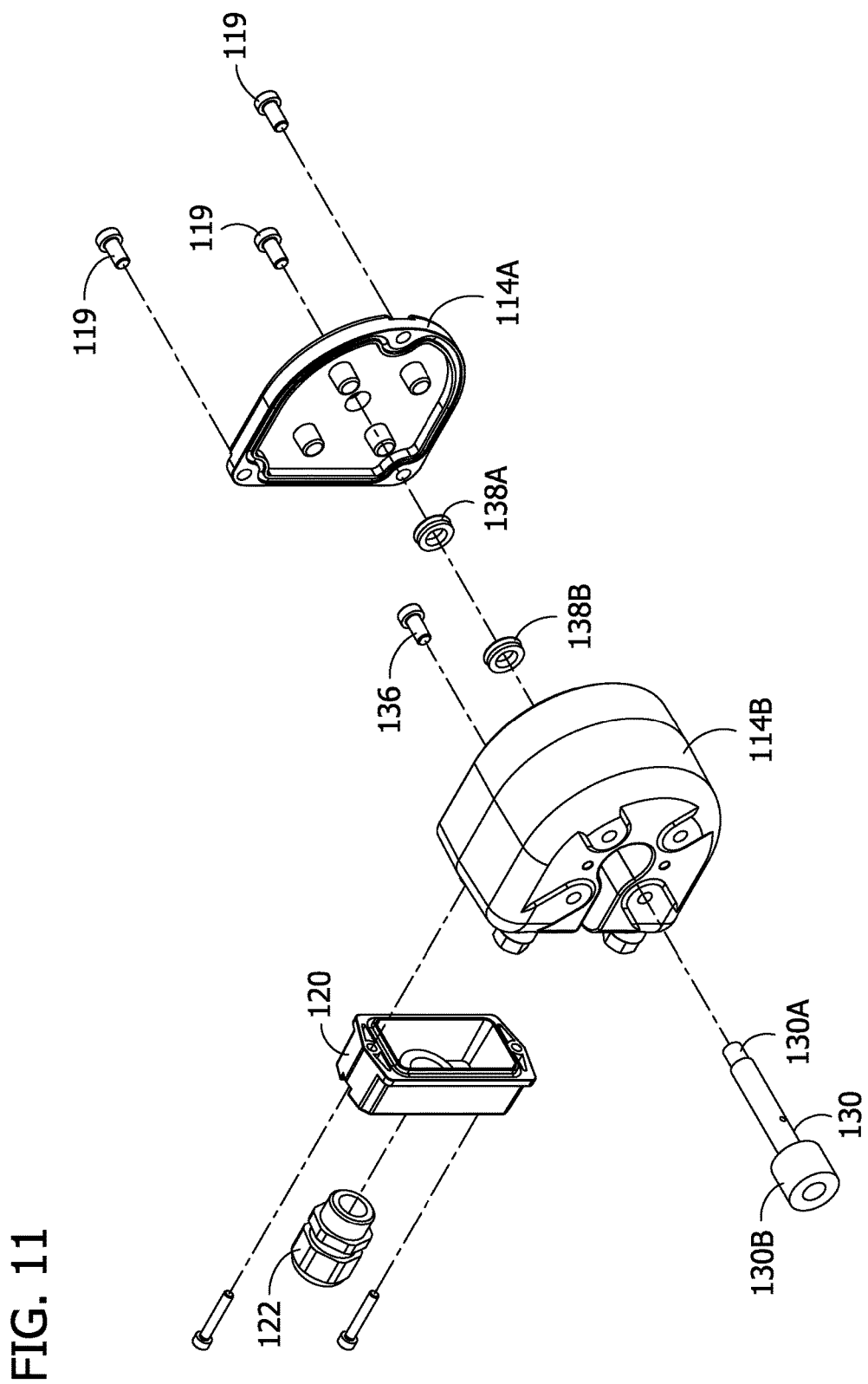
FIG. 11 is an exploded perspective of a housing, a communications module, and a linking pin of the limit switch assembly.
Figure 12:
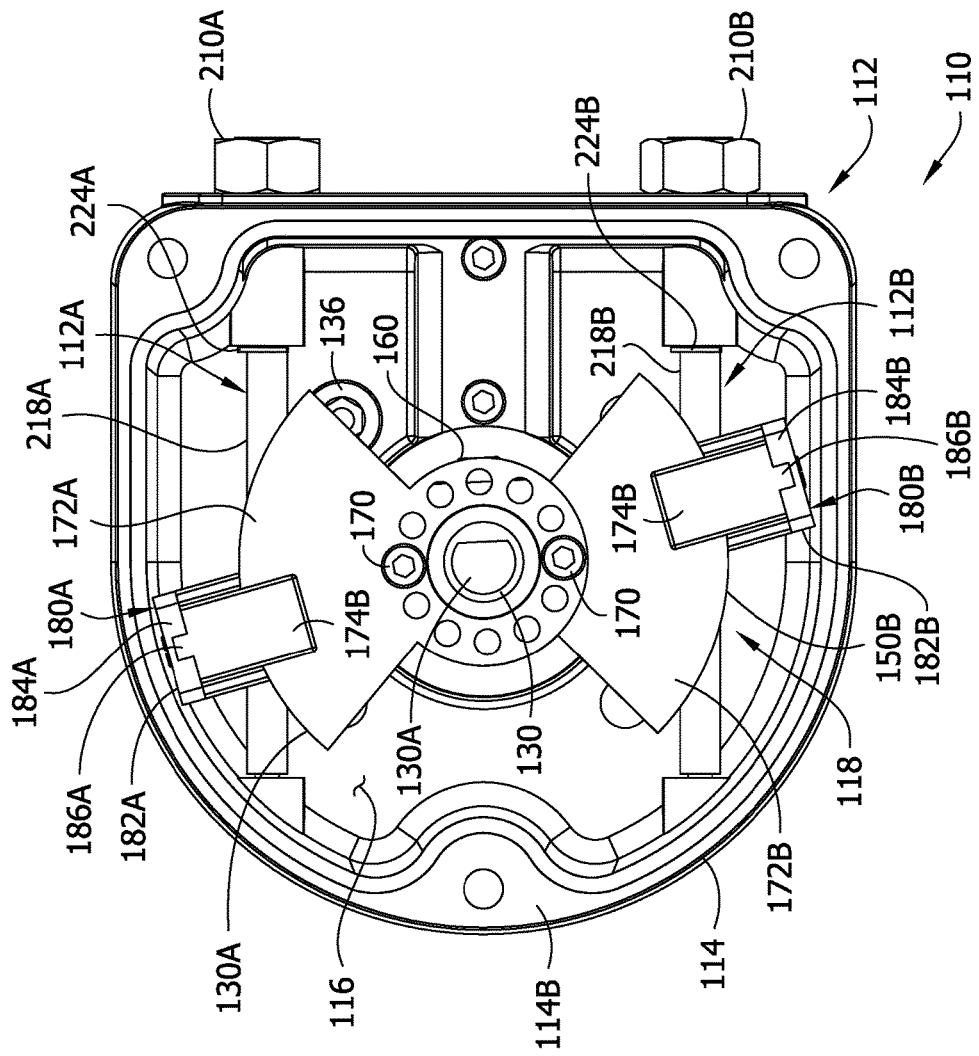
FIG. 12 is a proximal end plan view of the limit switch assembly with a proximal housing member and the communications module removed to reveal a sensor cavity.
Figure 13:
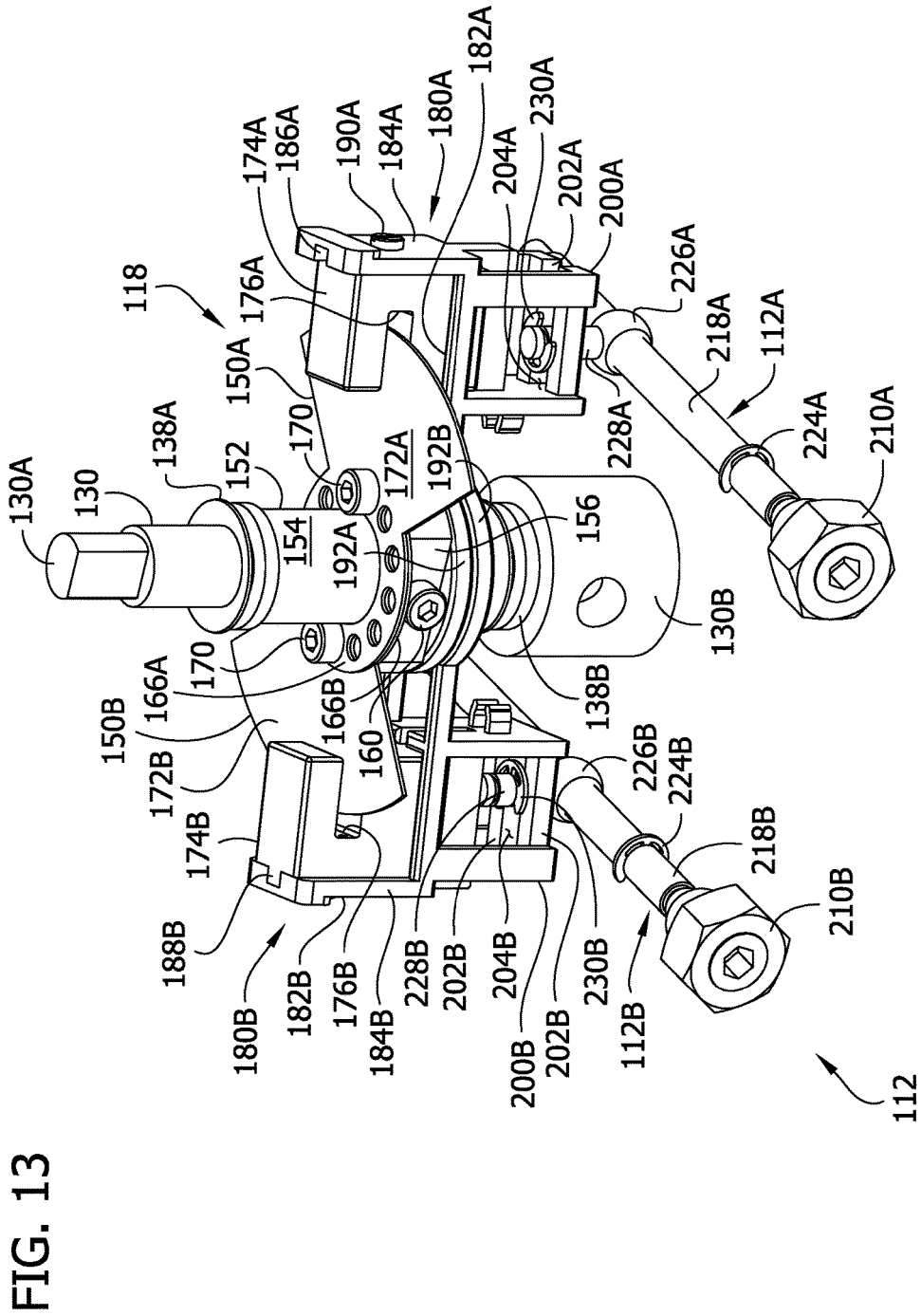
FIG. 13 is a perspective of a sensor assembly of the limit switch assembly removed from the housing.

Referring to FIGS. 3-11, the limit switch assembly 110 comprises a limit switch assembly housing 114 that defines a sensor cavity 116 for receiving a limit position sensing assembly, generally indicated at 118. In the illustrated embodiment, the housing 114 is a two-part housing comprising a proximal housing member 114A and a distal housing member 114B. The proximal housing member 114A defines a proximal end wall of the housing 114, and the distal housing member 114B defines a distal end wall and a perimeter side wall of the housing. The proximal and distal end walls are spaced apart from another along a feedback axis FA and define the proximal and distal boundaries of the sensor cavity 116 (FIGS. 9-10). The perimeter side wall extends along the feedback axis FA between the proximal and distal end walls of the housing and circumferentially around the sensor cavity 116. The illustrated perimeter side wall defines an enclosed U-shape perimeter, including a curved side and an opposite substantially flat side, but it is understood that other housings can have other shapes in other embodiments. In the illustrated embodiment, the proximal housing member 114A and the distal housing member are assembled using three screws 119, but other housings can be assembled in other ways without departing from the scope of the invention.

The limit switch assembly 110 includes a communications module 120 that is supported on the housing 114 on the flat side of the perimeter side wall opposite the curved side. The communications module 120 is operatively connected to the limit position sensing assembly 118 and a control processor (not shown) to receive limit position signals from the limit position sensing assembly and to transmit the limit position signals to the control processor. In one or more embodiments, the communications module 120 can include a local control processor that is operatively connected to, for example, the positioner 20 of valve assembly 10 to provide redundant feedback control of the positioner. In the illustrated embodiment, the communications module 120 includes a connector 122 for connecting the limit switch assembly 110 to a cable or wire (not shown) for transmitting signals to a control processor or other device. It is understood that in other embodiments, the communications module could be configured for wireless communications in addition or as an alternative to having a wired connector.

The housing 114 is shaped and arranged for receiving a linking pin 130 (broadly, a feedback member) of the limit position sensing assembly 118 that extends within the sensor cavity 116 along the feedback axis FA. The proximal housing member 114A defines a feedback opening 132A in the proximal end wall of the housing 114 that provides access to the linking pin 130 through the proximal end wall of the housing. Likewise, the distal housing member 114B defines a feedback opening 132B in the distal end wall of the housing 114 that provides access to the linking pin 130 through the distal end wall of the housing. Thus, the proximal end portion 130A of linking pin 130 is exposed through the proximal feedback opening 132A and the distal end portion 130B of linking pin 130 is exposed through the distal opening 132B. Each of the feedback openings 132A, 132B extend from an inner surface through an outer surface of the respective end wall of the housing 114 to communicate between the sensor cavity 116 and an exterior of the housing. The feedback openings 132A, 132B are aligned with one another at spaced apart locations along the feedback axis FA. When the linking pin 130 is operatively installed in the housing 114, a proximal end portion 130A extends through the feedback opening 132A and protrudes from the outermost surface of the proximal end wall of the housing.

As will be explained in further detail below, the proximal end portion 130A of linking pin 130 is configured to be operatively connected to the feedback linkage 30 of valve assembly 110 such that the linkage drives rotation of the linking pin with respect to the housing 114 about the feedback axis FA in response to movement of the stem 18 of actuator 14. When the linking pin 130 is operatively installed in the housing 114, a distal end portion 130B extends through the feedback opening 132B but remains slightly recessed from the distalmost surface of the housing as explained more fully below. As explained below, the distal end portion 130B of linking pin 130 is also configured to be operatively connected to the feedback shaft 28 of positioner 20 so that the feedback shaft rotates conjointly with the linking pin about the feedback axis FA. The positioner 20 senses the rotational position of the feedback shaft 28 about the feedback axis FA to determine the valve position.

The housing 114 is shaped and arranged so that when the linking pin 130 is installed the distal end portion 130B is recessed from the distalmost surface of the housing to allow the limit switch assembly 110 to be mounted on the positioner 20 in a compact, end-to-end arrangement. Specifically, the distal housing member 114B is shaped and arranged to define a depression 134 in the distal end wall of the housing 114. The depression 134 extends from the distalmost surface of the housing 114 along the feedback axis FA toward the proximal housing member 114B to an inner end portion. The feedback opening 132B is formed in the inner end portion of the depression 134, which is spaced apart from the distalmost surface of the housing (which is substantially flat and oriented generally orthogonal to the feedback axis FA in the illustrated embodiment). Thus, the distal end portion 130B of linking pin 130 can extend through the distal feedback opening 132 and protrude from the inner end of the depression 134 while remaining recessed inwardly from the distal end of the housing 114. As shown in FIG. 2, when the limit switch assembly 110 is mounted on the valve positioner 20, the two devices are arranged in end to end engagement. The flat distal end of the limit switch assembly 110 abuts the flat proximal end of the positioner enclosure 22. In the illustrated embodiment, a screw 136 extends through the distal end wall of the limit switch assembly housing 114 for fastening the housing to the proximal end wall of the positioner enclosure 22. The feedback shaft 28 of positioner 20, which protrudes from the proximal end of the enclosure 22, is received in the depression 134, where it is operatively connected to the linking pin 130 as described in further detail below. A channel 137 is formed in the perimeter side wall of the limit switch assembly housing 114 and communicates with the interior of the depression 134 to allow access to the distal end portion 130B of linking pin 130 and the feedback shaft 28 therein.

The linking pin 130 extends along the feedback axis FA from the proximal end portion 130A to the distal end portion 130B. The proximal end portion 130A extends through the feedback opening 132A in the proximal end wall of the housing for being operatively connected to the actuator stem 18, and the distal end portion 130B extends through the feedback opening 132B in the distal end wall of the housing for being connected to the feedback shaft 28 within the interior of the depression 134. In the illustrated embodiment, a proximal seal 138A is mounted on the linking pin 130A adjacent the proximal end portion 130A in axial alignment with the proximal opening 132A and a distal seal 138B is mounted on the linking pin adjacent the distal end portion 130B in axial alignment with the distal opening 132B. The seals 138A, 138B extend between the linking pin 130 and the walls of the housing 114 to provide environmental seals of each of the feedback openings 132A, 132B that inhibit contaminants from passing into the sensor cavity and fouling the limit position sensing assembly 118.

In the illustrated embodiment, the actuator stem 18 is connected to the proximal end portion 130A of linking pin 130 to drive the linking pin in rotation about the feedback axis FA. More specifically, the actuator stem 18 is configured drive the linking pin 130 through a range of motion including a first limit position and a second limit position. As explained below, when the limit position sensing assembly 118 is properly calibrated, the actuator stem 18 moves the linking pin 130 to the first limit position when the valve 12 is in the fully open position and moves the linking pin to the second limit position when the valve is in the fully closed position. The proximal end portion 130A of linking pin 130 defines a locking formation for connecting the linking pin to an output link of the feedback linkage 30. In the illustrated embodiment, the locking formation is a male formation with a D-shaped perimeter cross-sectional shape for being received in a corresponding socket of the output link of the feedback linkage 22. A set screw or other retainer (not shown) can extend radially through the output link of the feedback linkage 22 to engage the flat, axially extending surface of the interlocking formation of the proximal end portion 130A of linking pin 130 and thereby fix the linking pin to the output link for conjoint rotation about the feedback axis FA.

The distal end portion 130B of linking pin 130 is configured for being operatively connected to the feedback shaft 28 of valve positioner 20 such that movement of the linking pin drives corresponding movement of the feedback shaft. In the illustrated embodiment, the linking pin 130 is configured to drive the feedback shaft 28 in rotation about the feedback axis FA. As explained above, the positioner 20 is configured to sense the rotational position of the feedback shaft 28 about the feedback axis FA to provide feedback control of the valve. The distal end portion 130B of linking pin 130 defines a locking formation for connecting the linking pin to the feedback shaft 28. Suitably, the locking formation of the distal end portion 130B is complementary to the locking formation of the proximal end portion 130A. For example, the distal end portion 130B can be shaped and arranged to matingly receive a locking formation of the feedback shaft 28 that is substantially the same as the proximal locking formation of the linking pin 130. Thus, in the illustrated embodiment, the locking formation of the distal end portion 130B comprises a female formation defining a circular socket of about the same diameter as the widest portion of the D-shaped formation at the proximal end portion 130A of linking pin 130.

A set screw 140 extends radially through a threaded opening formed in the distal end portion 130B of linking pin 130 to engage the flat, axially extending surface of the D-shaped interlocking formation of the feedback shaft 28 and thereby fixes the linking pin to the feedback shaft for conjoint rotation about the feedback axis FA. Thus, when the limit switch assembly 110 is mounted on the positioner 20, the feedback shaft 28 and the linking pin 130 are aligned along the feedback axis FA and at least partially overlap one another along the feedback axis. As can now be seen, forming the proximal and distal end portions 130A, 130B of linking pin 130 to have complementary interlocking shapes configures the proximal end portion of the linking pin and the feedback shaft 28 of positioner 20 for mating with the same interlocking formation. This allows the same type of valve positioner 20 to be operatively connected to the feedback linkage 30, with or without a limit switch assembly 110 installed between the positioner and the actuator 14 and with or without the linking pin 130 forming an additional connective link in the feedback linkage.

Figure 18:
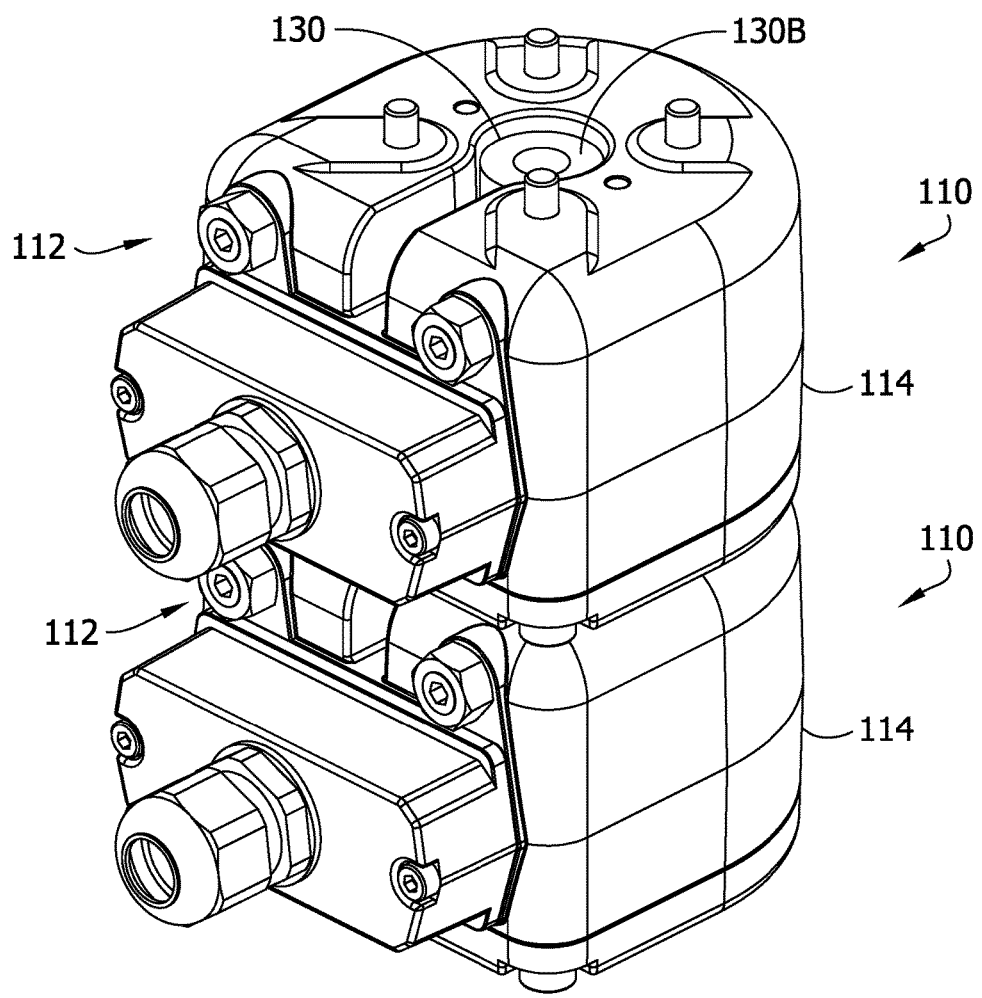
FIG. 18 is a perspective of the limit switch assembly connected to another limit switch assembly in end-to-end fashion.

In addition, as shown in FIG. 18, forming the proximal and distal end portions 130A, 130B of the linking pin 130 to have complementary interlocking shapes allows two or more limit switch assemblies 110 to be linked together in end-to-end fashion and installed between the actuator 16 and the positioner 20. In a valve assembly 10 comprising a plurality of limit switch assemblies 110, the limit switch assemblies are stacked end-to-end. The proximal end portion 130A of the linking pin of the proximal-most limit switch assembly 110 is connected directly to the feedback linkage and the proximal end portion of the linking pin of each additional limit switch assembly is connected directly to the distal end portion 130B of the linking pin of the proximal-adjacent limit switch assembly. The distal end portion 130B of the linking pin 130 distal-most limit switch assembly 110 is connected to the feedback shaft 28 of the positioner 20, and the distal end portion of the linking pin of each additional limit switch assembly is connected to the proximal end portion 130A of the linking pin of the distal-adjacent limit switch assembly. Using two limit switch assemblies 110 enables the valve assembly 10 to provide limit indications at up to four distinct limit positions. In addition, using two or more limit switch assemblies allows redundant detection of one or more limit positions.

Figure 19:
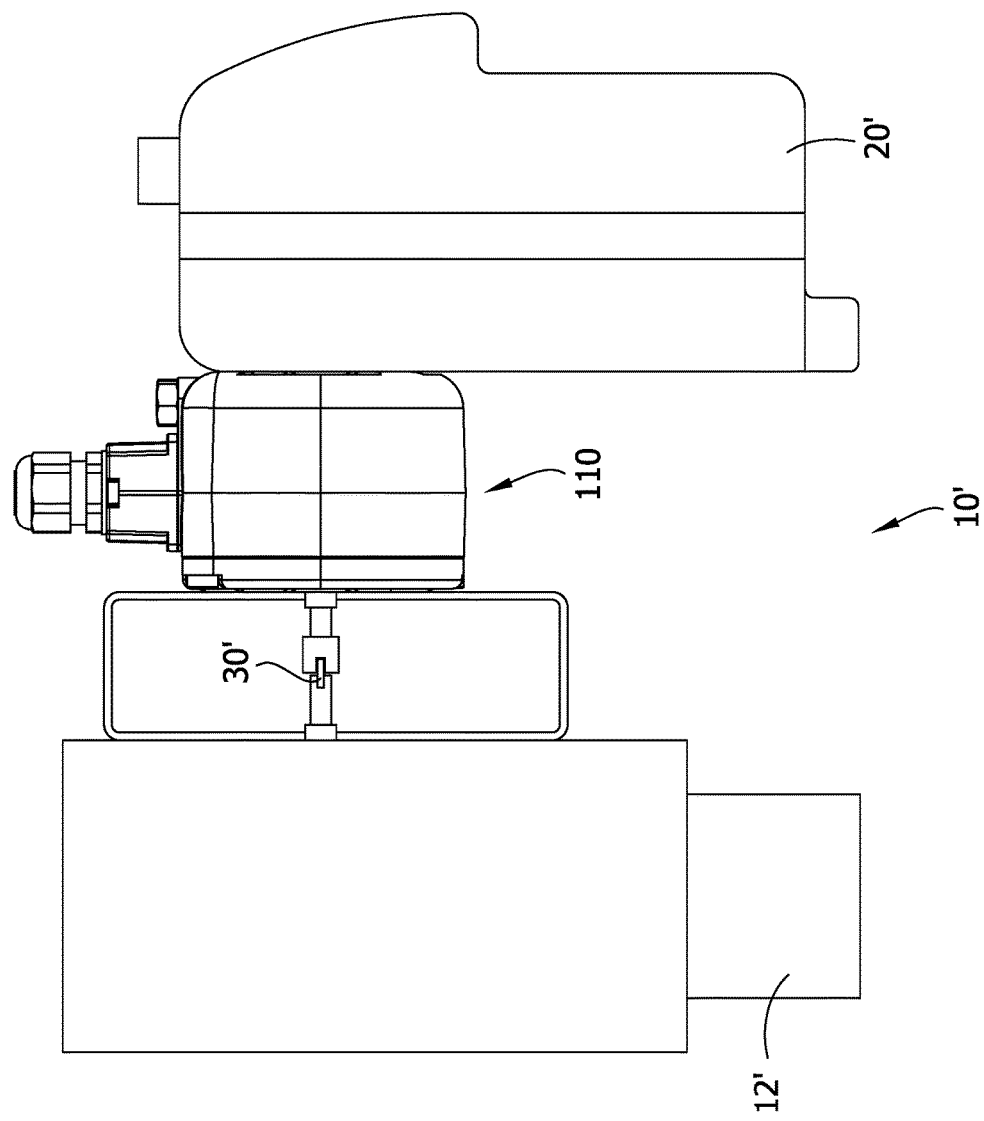
FIG. 19 is a perspective of the limit switch assembly installed in a rotary valve assembly.

As set forth above and as shown in FIG. 19, the limit switch assembly 110, and in particular the linking pin 130, is also configured to be installed in a rotary valve assembly 10'. The rotary valve assembly 110' includes a rotary valve 12 'comprising a valve member (not shown) configured to be rotated about its axis by a pneumatic actuator (not shown). The valve member is operatively connected to a feedback pin 30' (broadly, a feedback linkage) that rotates with the valve member about the axis of the valve member. The free end portion of the feedback pin 30' is connected to the proximal end portion 130A of the linking pin 130 to rotate the linking pin in response to movement of the valve 12' in the same manner as the feedback linkage 30. Thus, the limit switch assembly 110 functions in the same manner both rotary and linear valve assemblies.

Referring to FIGS. 12-15, the illustrated limit position sensing assembly 118 includes first and second limit position sensing assemblies 118A, 118B (e.g., first and second limit switches) that comprise the same components arranged on different sides of the linking pin 130 at slightly offset locations along the feedback axis FA. Throughout this disclosure, components of the first position sensing assembly 118A will be indicated by a reference number followed by the reference character 'A' and like components of the second position sensing assembly 118B will be indicated by the reference number followed by the reference character 'B'. In general, the first position sensing assembly 118A is configured to detect when the linking pin 130 is rotated about the feedback axis FA to a first limit position, and the second sensing assembly 118B is configured to detect when the linking pin is rotated about the feedback axis to a second limit position. As will be explained in further detail below, the calibration mechanism 112 comprises an assembly including a first calibration linkage 112A configured to adjust the location of the first limit position to, for example, correspond with the position of the linking pin 130 in the fully open valve position and a second calibration linkage 112A configured to adjust the location of the second limit position to, for example, correspond with the position of the linking pin in the fully closed valve position. Although the illustrated sensing assembly 118 includes first and second limit position sensing assemblies 118A, 118B for detecting first and second limit positions of the linking pin 130, it will be understood that a limit switch assembly, or a limit switch box, could have other numbers of limit position sensing assemblies or limit switches configured to detect other numbers (e.g., one or more than two) of limit positions of a limit switch assembly feedback member.

Each limit position sensing assembly 118A, 118B comprises an indicator member 150A, 150B that is attached to the linking pin 130 for conjoint rotation with the linking pin about the feedback axis FA. An indicator mounting collar 152 is fastened to the linking pin 130 for attaching the indicator members 150A, 150B to the mounting pin. The mounting collar 152 comprises a proximal tube portion 154 and a distal flange portion 156 that extends radially outward from the proximal tube portion. A threaded collar mounting hole 158 extends radially through the flange portion 156 for receiving a mounting screw 160. A middle portion of the linking pin 130 extends through the collar 152, and the screw 160 is threaded through the hole 158 and into an aligned mounting hole 162 (FIG. 14) formed in the linking pin to fasten the mounting collar 152 to the linking pin 130. First and second threaded indicator mounting holes 164 extend axially through the flange portion 156 at diametrically opposed locations about the feedback axis FA for fastening the indicator members 150A, 150B to the mounting collar 152.

Referring further to FIGS. 12-15, each indicator member 150A, 150B includes a ring portion 166A, 166B that defines an axial opening for receiving the tube portion 154 of mounting collar 152. The ring portions 166A, 166B of the respective indicator members 150A, 150B are stacked one atop the other upon the proximal end of the flange portion 158. A plurality mounting holes 168A, 168B extend axially through each ring portion 166A, 166B at circumferentially spaced positions about the feedback axis FA. A selected pair of each set of mounting holes 168A, 168B is aligned with the mounting holes 164 in the mounting collar 152 to align the indicator member 150A, 150B at the desired circumferential position with respect to the linking pin 130. Screws 170 are inserted through the mounting holes 168A, 168B of indicator members 150A, 150B and are threaded into the mounting holes 164 of mounting collar 152 to fasten the indicator members to the mounting collar. Thus, the screws 170 fix the indicator members 150A, 150B to the mounting collar 152 and the linking pin 130 at the selected circumferential position with respect to the linking pin for conjoint rotation with the linking pin about the feedback axis FA.

Each indicator member 150A, 150B includes a flag portion 172A, 172B that extends radially outward from the ring portion 166A, 166B. In the illustrated embodiment, the flag portions 172A, 172B are sector-shaped but other flag portions could have other shapes in other embodiments. Each flag portion 172A, 172B is configured to be detected by a position sensor 174A, 174B of the respective limit position sensing assembly 118A, 118B when the flag portion and the sensor are operatively aligned about the feedback axis FA. The circumferential position of the flag portion 172A, 172B about the feedback axis FA at which it is operatively aligned with the sensor 174A, 174B for being detected by the sensor defines a limit position of the limit switch assembly 110. (It is understood that the sensor 174A, 174B can "detect" the flag portion 172A, 172B by being activated when the flag portion reaches the limit position or by being deactivated when the sensor reaches the limited position). As explained below, the limit position can be adjusted by adjusting the position of the sensor 174A, 174B about the feedback axis FA and thereby adjusting the circumferential position at which the indicator member 150A, 150B at is operatively aligned with the sensor. Any suitable sensor (e.g., a Hall effect sensor, an optical sensor, a magnetic sensor, etc.) for detecting when an indicator member and the sensor are positioned relative to one another in operative alignment (e.g., at a specific relative position or a narrow range of relative positions) may be used in various embodiments. But in the illustrated embodiment, each sensor 174A, 174B comprises a Hall effect sensor configured to detect a magnetic section of the flag portion 172A, 172B when the magnetic section is aligned with the sensor. Each sensor 174A, 174B defines a flag channel 176A, 176B. In use, the flag portion 172A, 172B of indicator member 152A, 152B rotates through the flag channel 176A, 176B and the sensor 174A, 174B detects the magnetic section when it is circumferentially aligned with the flag channel about the feedback axis.

Figure 14:
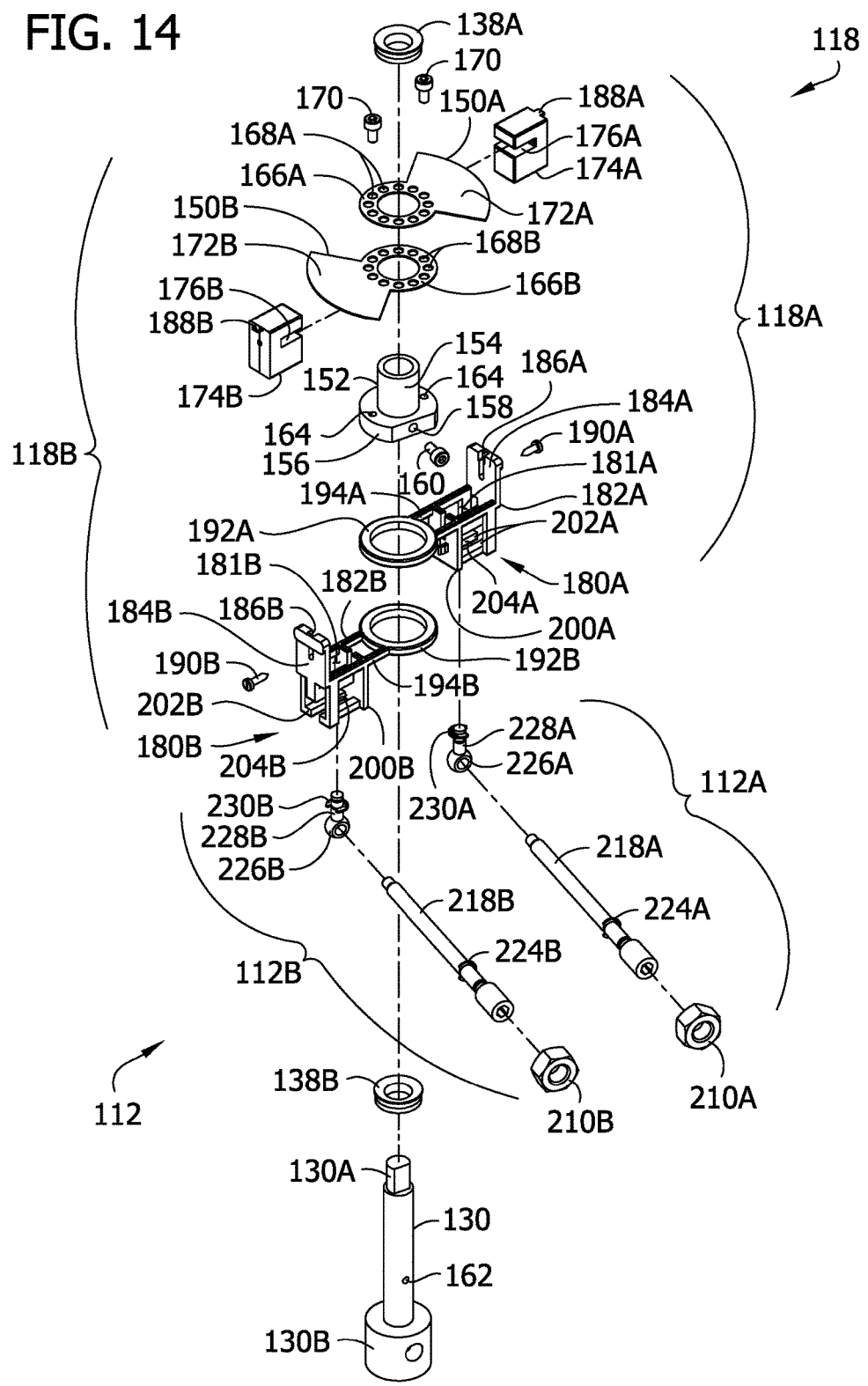
FIG. 14 is an exploded perspective of the sensor assembly.
Figure 16:
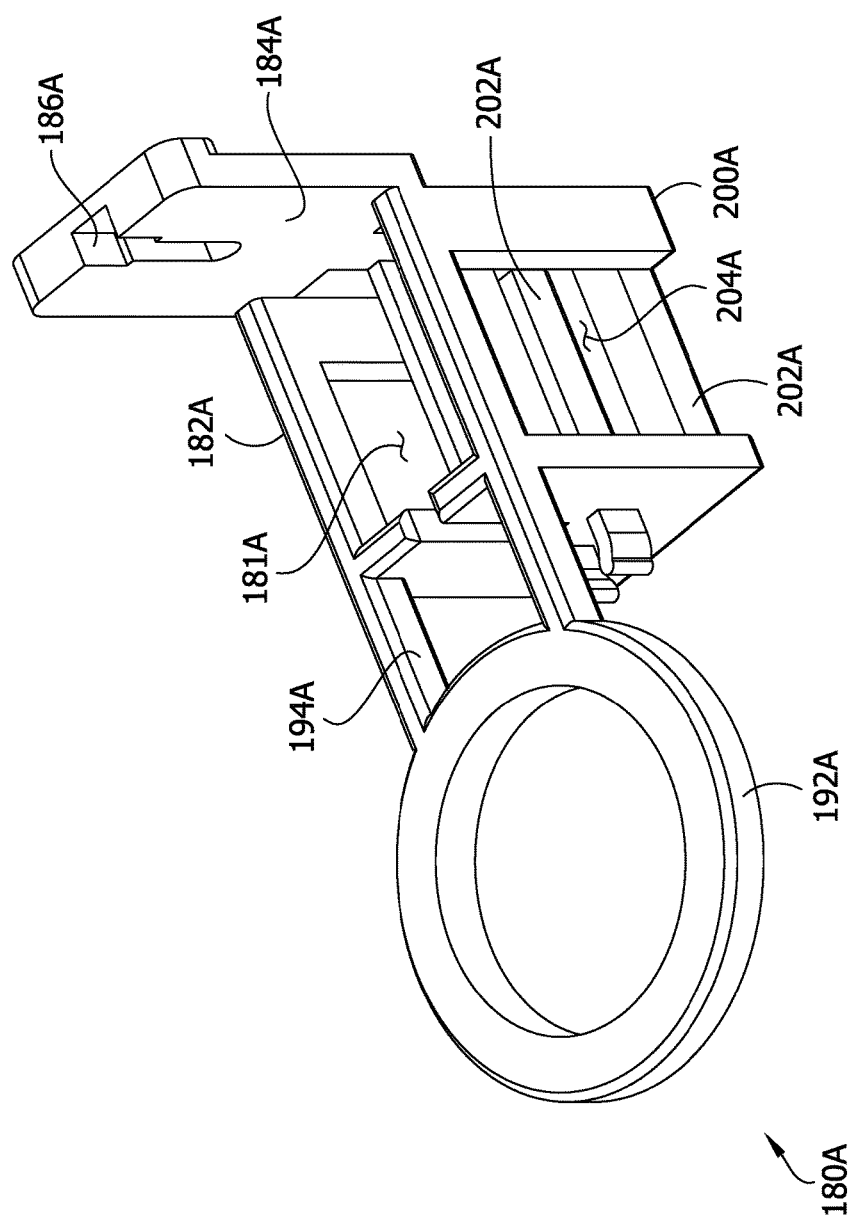
FIG. 16 is a perspective of a sensor mount of the limit switch assembly.

Each sensor 174A, 174B is mounted in the sensor cavity 116 on a sensor mount, generally indicated at 180A, 180B, respectively. The sensor mount 180A, 180B positions the sensor 174A, 174B along the feedback axis FA so that the flag portion 170A, 170B of one of the indicator members 150A, 150B is received in the respective flag channel 176A, 176B. Referring to FIGS. 14 and 16, each sensor mount 180A, 180B includes a sensor support portion 182A, 182B that is shaped and arranged for receiving the sensor 174A, 174B and attaching the sensor to the sensor mount. (FIG. 16 shows an enlarged view of the first sensor mount 180A; but as shown in FIG. 14, the second sensor mount 180B is identical to the first sensor mount, only having a different position within the sensor cavity 116.) Each illustrated sensor support portion 182A, 182B includes a frame that defines a sensor cavity 181A, 181B that receives a distal end portion of the sensor 174A, 174B. The sensor support portion 182A, 182B includes an axially extending outer wall 184A, 184B that defines an inwardly facing groove 186A, 186B. When the sensor 174A, 174B is inserted into the cavity 181A, 181B an outwardly facing projection 188A, 188B of the sensor is slidably received in the groove 186A, 186B to guide the sensor into proper alignment with the sensor support portion 182A, 182B of sensor mount 180A, 180B. When the sensor 174A, 174B is inserted into the cavity 181A, 181B, a screw 190A, 190B is inserted through the outer wall 184A, 184B and is threadably engaged with an outer end portion of the sensor 174A, 174B. The screw 190A, 190B thus fastens the sensor 174A, 174B to the sensor mount 180A, 180B.

The sensor mounts 180A, 180B are configured to mount the sensors 174A, 174B on the linking pin 130 to constrain the sensors 174A, 174B for movement only in circumferential directions about the feedback axis FA. In the illustrated embodiment, each sensor mount 180A, 180B includes a bearing collar portion 192A, 192B that defines an opening through which the linking pin 130 extends along the feedback axis FA. In the illustrated embodiment, an arm portion 194A, 194A extends radially between the bearing collar portion 192A, 192B and the sensor support portion 182A, 182B to support the bearing collar on the sensor support portion and space the sensor support portion radially outward from the bearing collar portion. The arm 194A, 194B and the bearing collar 192A, 192B are axially aligned at a location that is spaced apart distally from the location of the flag channel 176A, 176B when the sensor 174A, 174B is received in the sensor mounting portion 182A, 182B so as not to interfere with the indicator member 150A, 150B extending into the channel. The bearing collar portions 192A, 192B are stacked one atop the other over the linking pin 130, between the distal end of the mounting collar flange portion 156 and the distal seal 138B. The mounting collar 152 and the distal seal 138B capture the bearing collar portions 192A, 192B at respective axial positions along the linking pin, and the bearing collar portions 192A, 192B bear against the linking pin 130 to constrain the respective sensor mounts 180A, 180B (and thus the sensors 174A, 174B) to move only in rotation about the linking pin and feedback axis FA.

Figure 15:
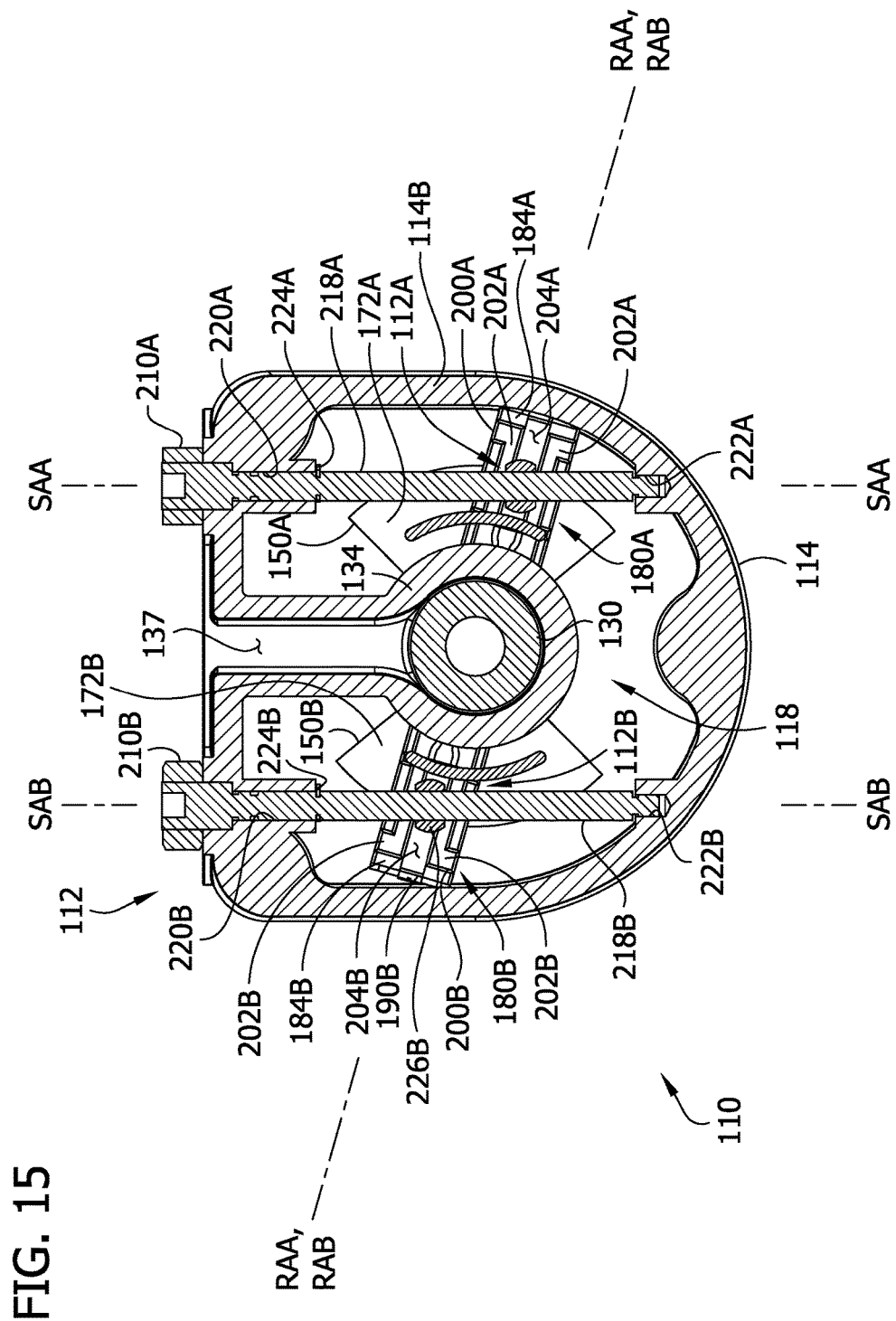
FIG. 15 is a cross section taken in the plane of line 15-15 of FIG. 5.

Each sensor mount 180A, 180B further includes a guide portion 200A, 200B connected to the distal end of the sensor mount portion 182A, 182B at a location spaced apart radially outward of the bearing collar portion 192A, 192B. The guide portion 200A, 200B includes opposite first and second rails 202A, 202B that define a race 204A, 204B. As shown in FIG. 15, each race 204A, 204B extends along a respective race axis RAA, RAB of sensor mount 180A, 180B. In the illustrated embodiment, the races 204A, 204B are oriented so that their axes RAA, RAB, respectively, extend radially of the feedback axis FA when the bearing collar portions 192A, 192B are received over the mounting pin 130. In the configuration shown in FIG. 15, the race axes RAA, RAB are coaxial because the sensor mounts 180A, 180B are arranged at diametrically opposite positions about the feedback axis FA. But as will be explained in further detail below, the calibration assembly 112 is configured to adjust the position of the sensors 174A, 174B by adjusting the position of the sensor mounts 180A, 180B, and thus the race axes RAA, RAB can be oriented transverse to one another in other configurations.

Each calibration linkage 112A, 112B is operatively connected to the sensor mount 180A, 180B to selectively adjust the position of the sensor mount with respect to the mounting pin 130 about the feedback axis FA. Thus, the calibration linkage 112A, 112B is configured to selectively adjust the relative positions of the corresponding sensor 174A, 174B and the respective indicator member 150A, 150B to adjust the location of the limit position for the respective sensor assembly 118A, 118B. In general, each calibration assembly 112 comprises an input member 210A, 210B movably mounted on the housing 116 outside the sensor cavity 116 and configured for moving an input link of the respective calibration linkage 112A, 112B. The calibration linkage 112A, 112B extends through the housing 114 and is operatively connected to the respective limit position sensor 174A, 174B and the respective input member 210A, 210B to adjust the relative position of the respective sensor and indicator member 150A, 150B and thereby adjust the respective limit position in response to movement of the input member.

In the illustrated embodiment, each calibration linkage 112A, 112B includes a calibration screw 218A, 218B extending along a screw axis SAA, SAB through a respective opening 220A, 220B formed in the flat side of the perimeter side wall of the housing 116 as shown in FIG. 15. The opposite curved side of the perimeter side wall of the housing 116 defines sockets 222A, 222B for receiving the free ends of the screws 218A, 218B. The holes 220A, 220B and the sockets 222A, 222B limit movement of the screws 218A, 218B in directions transverse to their screw axes SAA, SAB, respectively. The enlarged heads of the screws 218A, 218B engage the outer surface of the perimeter wall of the housing 116, and washer clips 224A, 224B (broadly, retainers) are received over the shafts of the screws in alignment with the inner surface of the perimeter wall of the housing. The heads of the screws 218A, 218B and the retainers 224A, 224B capture the screws against the perimeter wall of the housing 116 to limit movement of the screw along its axis. Thus, together, the holes 220A, 220B and sockets 222A, 222B formed in the perimeter wall of the housing 116, the heads of the screws 118A, 118B, and the retainers 224A, 224B constrain the screws for movement only in rotation about their screw axes SAA, SAB.

The input member 210A, 210B comprises a knob or nut having wrench flats that is press fit or otherwise attached to the head of the screw 218A, 218B to rotate conjointly with the screw about the respective screw axis SAA, SAB. The knob 210A, 210B is located on the exterior of the housing for rotating the screw 218A, 218B and thereby adjusting the linkage 212A, 212B from a location external to the sensor cavity 116. The head of the screw 218, 218B itself is also located on the exterior of the housing and can likewise be used as an input member driving movement of the calibration linkage 112A, 112B.

A calibration nut 226A, 226A is threadably engaged with the shaft of the calibration screw 218A, 218B such that rotation of the calibration screw relative to the calibration nut drives movement of the nut relative to the screw along the screw axis SAA, SAB. A mounting post 228A, 228B projects from the calibration nut 226A, 226B along an axis transverse to the screw axis SAA, SAB and generally parallel to the feedback axis FA. The mounting post 228A, 228B is slidably received in the respective race 204A, 204B for movement with respect to the sensor mount 180A, 180B along the race axis RAA, RAB. In the illustrated embodiment, washer clips 230A, 230B are secured to the mounting posts 228A, 228B for engagement with the proximal surfaces of the rails 202A, 202B to retain the mounting posts in the races 204A, 204B during use. When the input members 210A, 210B rotate the calibration screws 218A, 218B about their screw axes SAA, SAB, the calibration nuts 226A. 226B travel along the lengths of the screws and the mounting posts 228A, 228B engage the rails 202A, 202B of sensor mounts 180A, 180B to drive movement of the sensor mounts. But as explained above the sensor mounts 180A, 180B are constrained by the bearing collars 192A, 192B, respectively, to move only in rotation about the feedback axis FA. So as the sensor mounts 180A, 180B rotate, the mounting posts 226A, 226B, which are constrained to travel only along the screw axes SAA, SAB, and the sensor mounts move relative to one another along the race axes RAA, RAB, respectively. The mounting posts travel through the races 204A, 204B as they guide movement of the sensor mounts 180A, 180B about the feedback axis FA. The sensors 174A, 174B move with the sensor mounts 180A, 180B about the feedback axis FA and relative to the indicator members 150A, 150B to adjust the location of the limit positions. The guide portion 200A, 200B of the sensor mount 180A, 180B and the respective mounting post 228A, 228B are therefore shaped and arranged to limit relative movement between the sensor mount and the calibration nut 226A, 226B to relative rotation about an axis of the mounting post and relative translation along the respective race 204A, 204B.

An exemplary method of using the valve assembly 10 will now be briefly described. Initially, a technician installs the limit switch assembly 110 on the positioner 20. As explained above, the technician inserts the end of the feedback shaft 28 into the socket formed in the distal end portion 130A of linking pin 130 and fastens the housing 116 to the positioner enclosure 22 using the screw 136. The technician also installs the set screw 140 to fasten the linking pin 130 to the feedback shaft 28. The technician then connects the proximal end of the linking pin 130 to the output link of the feedback linkage 30 and fixes the limit switch assembly 110 and the positioner 20 to the actuator 14 using a bracket or other support. In this configuration, the limit switch assembly 110 is received between the positioner 20 and the actuator 14 such that the proximal end wall of the housing 114 is located adjacent the actuator and the distal end wall of the housing is located adjacent the positioner. In an embodiment, this arrangement is referred to as a "sandwich" mount. In addition, the linking pin 130 is operatively connected to the feedback linkage 30 for movement about the feedback axis FA in response to movement of the actuator stem 16 and the linking pin operatively links the actuator 14 to the feedback shaft 28 of positioner 20 to drive movement of the feedback shaft in response to movement of the actuator.

With the limit switch assembly 110 operatively installed in the valve assembly 10, the technician next calibrates the limit positions to correspond with the fully open position and the fully closed position of the actuator 14. Without opening the limit switch assembly housing 114, the technician adjusts the relative positions of the sensors 174A, 174B and the indicator members 150A, 150B by rotating the input members 210A, 210B to drive movement of the calibration linkages 112A, 112B. For example, using a tool positioned on the exterior of the housing 114, the technician rotates the first input member 210A and the first calibration screw 218A about the screw axis SAA to drive the first calibration nut 226A along the screw axis. This rotates the first sensor mount 180A and the first sensor 174A about the feedback axis FA with respect to the mounting pin 130 and the first indicator member 150A. The technician rotates the input member 210A until the first sensor 174A is operatively aligned about the feedback axis FA for detecting the first indicator member 150A when the linking pin 130 is positioned at a rotational position that correlates with a fully open position of the actuator stem 16. Likewise, using a tool positioned on the exterior of the housing 114, the technician rotates the second input member 210B and the second calibration screw 218B about the screw axis SAB to drive the second calibration nut 226B along the screw axis. This rotates the second sensor mount 180B and the second sensor 174B about the feedback axis FA with respect to the mounting pin 130 and the second indicator member 150B. The technician rotates the input member 210B until the second sensor 174B is operatively aligned about the feedback axis FA for detecting the second indicator member 150B when the linking pin 130 is positioned at a rotational position that correlates with a fully closed position of the actuator stem 16. Subsequently, when the positioner 20 positions the actuator 14 in the fully open position, the first sensor 174A detects the first indicator member 150A and outputs a limit signal representing that the valve 12 is in the fully open position. And when the positioner 20 positions the actuator 14 in the fully closed position, the second sensor 174B detects the second indicator member 150B and outputs a limit signal representing that the valve 12 is in the fully closed position.

As can be seen therefore, the shape and arrangement of the housing 114 facilitates mounting the limit switch assembly 110 on the positioner 20 in a compact, end-to-end arrangement and, moreover, allows the limit switch assembly to be selectively installed on the proximal end of the positioner without modifying the positioner to accommodate the limit switch assembly. Thus, the configuration of the limit switch assembly 110 enhances the versatility of the positioner 20, allowing redundant feedback to be added via the limit switch assembly with great simplicity and without substantially increasing the footprint of the installed positioner. Moreover, the complementary interlocking shapes of the end portions of the linking pin 130 allows the same type of valve positioner 20 to be operatively connected to the feedback linkage 30, with or without a limit switch assembly 110 linking the positioner to the actuator. In addition, the calibration assembly 112 allows the limit positions to be calibrated from a location external to the sensor cavity 116 without opening the housing 114 so that the limit switch assembly 110 may remain installed between the positioner 20 and the actuator 14 during calibration.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A limit switch assembly configured to be operatively installed in a valve assembly, the valve assembly comprising a valve, an actuator movable to selectively open and close the valve, and a positioner for controlling movement of the actuator, the limit switch assembly comprising:
   a housing defining a sensor cavity and having a proximal end wall and a distal end wall spaced apart from one another along a feedback axis; and
   a limit position sensing assembly received in the sensor cavity comprising:
      a linking pin movably connected to the housing for movement with respect to the housing through a range of motion including at least one limit position, the linking pin extending along the feedback axis and having a proximal end portion and a distal end portion spaced apart from one another along the feedback axis, the proximal end portion of the linking pin being configured for being operatively connected to the actuator such that movement of the actuator drives corresponding movement of the linking pin through the range of motion; and
      at least one position sensor configured to detect when the linking pin is positioned in the at least one limit position;
   wherein the proximal end portion of the linking pin is exposed through the proximal end wall of the housing for being operatively connected to the actuator and the distal end portion of the linking pin is exposed through the distal end wall for being operatively connected to a feedback shaft of the positioner to operatively install the limit switch assembly in the valve assembly, and wherein the limit switch assembly is received between the positioner and the actuator when the limit switch assembly is operatively installed in the valve assembly such that the proximal end wall is located adjacent the actuator and the distal end wall is located adjacent the positioner and the linking pin operatively links the actuator to the feedback shaft of the positioner to drive movement of the feedback shaft in response to movement of the actuator.

2. A limit switch assembly as set forth in claim 1 wherein the proximal end portion of the linking pin defines a first locking formation and the distal end portion of the linking pin defines a second locking formation that is complementary to the first locking formation.

3. A limit switch assembly as set forth in claim 1 wherein the linking pin is mounted on the housing and rotatable about the feedback axis in response to movement of the actuator.

4. A limit switch assembly as set forth in claim 1 wherein at least one of the proximal end portion and the distal end portion of the linking pin protrudes from the respective end wall of the housing.

5. A limit switch assembly as set forth in claim 1 wherein at least one of the proximal end portion and the distal end portion of the linking pin is recessed from an outer surface of the respective end wall of the housing.

6. A limit switch assembly as set forth in claim 1 wherein each of the distal end wall and the proximal end wall defines a respective feedback opening extending from an inner surface to an outer surface thereof to communicate between the sensor cavity and an exterior of the housing.

7. A limit switch assembly as set forth in claim 6 wherein the feedback openings in the distal end wall and the proximal end wall are aligned with one another at spaced apart locations along the feedback axis.

8. A limit switch assembly as set forth in claim 6 wherein the distal end wall includes a depression extending along the feedback axis toward the proximal end wall to an inner end portion, the feedback opening in the distal end wall being formed in the inner end portion of the depression.

9. A limit switch assembly as set forth in claim 8 wherein the distal end portion of the linking pin protrudes from the inner end portion of the depression and is recessed inwardly from the outer surface of the distal end wall.

10. A limit switch assembly as set forth in claim 8 wherein the housing further comprises a side wall extending along the feedback axis between the proximal end wall and the distal end wall, the side wall defining an access channel aligned with the depression for providing access to the depression through the access channel.

11. A limit switch assembly as set forth in claim 6 further comprising a first seal mounted on the shaft in alignment with feedback opening in the proximal end wall and a second seal mounted on the shaft in alignment with the feedback opening in the distal end wall for providing environmental seals of each of the feedback openings between the linking pin and the housing.

12. A limit switch assembly as set forth in claim 1 in combination with the positioner.

13. A combination as set forth in claim 12 wherein the positioner comprises an enclosure having a proximal end wall, the limit switch assembly being configured to be mounted on the proximal end wall of the enclosure.

14. A combination as set forth in claim 13 wherein the limit switch assembly is configured to be mounted on the positioner such that the distal end wall of the housing of the limit switch assembly and the proximal end wall of the enclosure of the positioner are arranged in end-to-end engagement.

15. A combination as set forth in claim 13 wherein the feedback shaft and the linking pin are shaped and arranged to be aligned along the feedback axis and at least partially overlap one another along the feedback axis when the limit switch assembly is mounted on the positioner.

16. A limit switch assembly configured to be operatively installed in a valve assembly, the valve assembly comprising a valve and an actuator movable to selectively open and close the valve, the limit switch assembly comprising:
   a housing defining a sensor cavity;
   a limit position sensing assembly received in the sensor cavity comprising:
      a feedback member configured to be operatively connected to the actuator such that movement of the actuator drives movement of the feedback member through a range of motion including at least one limit position; and
      at least one position sensor configured to detect at least one position of the feedback member in the range of motion; and
   a calibration mechanism for adjusting a relative position between the feedback member and the at least one position sensor to operatively align the at least one position sensor with the feedback member for detecting the position of the feedback member in the at least one limit position, the calibration mechanism comprising an input member movably mounted on the housing outside the sensor for movement in response to an input force and a calibration linkage extending through the housing and being operatively connected to the limit position sensing assembly and the input member to adjust said relative position between the feedback member and the at least one position sensor in response to movement of the input member.

17. A limit switch assembly as set forth in claim 16 wherein the calibration linkage includes a calibration screw and a calibration nut threadably engaged with the calibration screw for movement along the calibration screw in response to rotation of the calibration screw.

18. A limit switch assembly as set forth in claim 17 wherein the at least one position sensor is mounted on the calibration nut for movement relative to the housing along the calibration screw with the calibration nut.

19. A limit switch assembly as set forth in claim 18 wherein the calibration linkage further comprises a sensor mount mounting the at least one position sensor on the calibration nut, the sensor mount being operatively connected to the feedback member to constrain the at least one position sensor to move in rotation about a feedback axis along which the feedback member extends.

20. A limit switch assembly as set forth in claim 19 wherein the sensor mount comprises a collar portion received over the feedback member, a sensor support portion receiving the at least one position sensor, and an arm portion extending radially of the feedback axis and connecting the sensor support portion to the collar portion.

21. A limit switch assembly as set forth in claim 19 wherein the linkage further comprises a mounting post attached to the calibration nut and extending from the nut generally along an axis generally parallel to the feedback axis.

22. A limit switch assembly as set forth in claim 21 wherein the sensor mount comprises a guide portion defining a race, the mounting post being captured in the race of the guide portion to limit relative movement between the sensor mount and the calibration nut.

23. A limit switch assembly as set forth in claim 18 wherein the input member comprises a knob mounted on the calibration screw for rotating the calibration screw.

24. A limit switch assembly as set forth in claim 16 wherein the at least one position sensor comprises a first position sensor, the limit position sensing assembly further comprising a second position sensor.

25. A limit switch assembly as set forth in claim 24 wherein the input member and the linkage of the calibration mechanism respectively comprise a first input member and a first linkage operatively connecting the first input member to the first position sensor to adjust a relative position between the feedback member and the first position sensor in response to movement of the first input member, the calibration mechanism further comprising a second input member and a second linkage operatively connecting the second input member to the second position sensor to adjust a relative position between the feedback member and the second position sensor in response to movement of the second input member.

26. A limit switch assembly as set forth in claim 25 wherein the limit position sensing assembly comprises a first indicator member and a second indicator member mounted on the feedback member for movement with the feedback member through the range of motion.

27. A limit switch assembly as set forth in claim 26 wherein the feedback member extends along a feedback axis, the first position sensor being configured to detect the first indicator member when the first indicator member is operatively aligned with the first position sensor about the feedback axis and the second position sensor being configured to detect the second indicator member when the second indicator member is operatively aligned with the second position sensor about the feedback axis.

28. A limit switch assembly as set forth in claim 26 wherein the feedback member is movable through a range of motion including a first limit position and a second limit position, the first linkage is configured to move the first position sensor to be operatively aligned with the first indicator member when the feedback member is in the first limit position and the second linkage is configured to move the second position sensor to be operatively aligned with the second indicator member when the feedback member is in the second limit position.

\* \* \* \* \*